United States Patent
Furukata et al.

(10) Patent No.: US 9,579,858 B2
(45) Date of Patent: Feb. 28, 2017

(54) METHOD OF MANUFACTURING OPTICAL DEVICE

(71) Applicant: KYOCERA CRYSTAL DEVICE CORPORATION, Higashine-shi, Yamagata (JP)

(72) Inventors: Yukiko Furukata, Higashine (JP);
Kotaro Wakabayashi, Higashine (JP);
Shingo Ishiuchi, Higashine (JP);
Akinori Ito, Higashine (JP)

(73) Assignee: KYOCERA CRYSTAL DEVICE CORPORATION, Higashine-shi (JP)

( * ) Notice: Subject to any disclaimer, the term of this patent is extended or adjusted under 35 U.S.C. 154(b) by 243 days.

(21) Appl. No.: 14/223,651

(22) Filed: Mar. 24, 2014

(65) Prior Publication Data

US 2014/0283976 A1    Sep. 25, 2014

(30) Foreign Application Priority Data

Mar. 23, 2013  (JP) ................................. 2013-061194
Mar. 23, 2013  (JP) ................................. 2013-061195

(51) Int. Cl.
*B29D 11/00* (2006.01)

(52) U.S. Cl.
CPC .... *B29D 11/0073* (2013.01); *B29D 11/00634* (2013.01); *Y10T 156/1052* (2015.01)

(58) Field of Classification Search
CPC ...................... B29D 11/0073; B29D 11/00634
See application file for complete search history.

(56) References Cited

U.S. PATENT DOCUMENTS

| 5,982,488 A | 11/1999 | Shirasaki | |
| 2011/0252636 A1* | 10/2011 | Kitahara | G01J 3/26 29/829 |
| 2012/0212822 A1* | 8/2012 | Kitahara | G01J 3/26 359/578 |

FOREIGN PATENT DOCUMENTS

| JP | 4-61181 A | 2/1992 |
| JP | 6-258611 A | 9/1994 |
| JP | 9-257567 A | 10/1997 |
| JP | 2005-10734 A | 1/2005 |
| JP | 2011-235300 A | 11/2011 |
| JP | 2013-238722 A | 11/2013 |
| JP | 2013-238738 A | 11/2013 |

* cited by examiner

*Primary Examiner* — Daniel McNally
(74) *Attorney, Agent, or Firm* — Westerman, Hattori, Daniels & Adrian, LLP

(57) ABSTRACT

A method uses a first mask which is comprised of an X-shaped arm, a pattern portion which is a crossed part of the X-shape and is formed in a polygon shape or a circle shape, and a frame member which is connected to the pattern portion, and a second mask which is comprised of a cross-shaped arm, a pattern portion which is a crossed part of the cross shape and is formed in a polygon shape or a circle shape, and a frame member which is connected to the pattern portion; and includes a first transparent member wafer metal film-forming step of superimposing the first mask on one transparent member wafer between two transparent member wafers and forming a metal film between the pattern portions and the frame members, a second transparent member wafer metal film-forming step of superimposing the second mask on the other transparent member wafer.

8 Claims, 23 Drawing Sheets

METHOD OF MANUFACTURING OPTICAL DEVICE

TECHNICAL FIELD

The present invention relates to a method for producing an optical device which is used in an optical instrument.

BACKGROUND ART

Conventionally, for optical instrument such as an optical communication, a measuring apparatus and a semiconductor laser, use has been made of an optical device such as an etalon, a halfwave plate and a quarterwave plate.

Some of these optical devices are comprised by bonding a plurality of transparent members with each other.

For example, when explaining an optical device of an etalon, there is proposed an air gap type which is configured by bonding two transparent members (see for example Patent Literature 1).

In such an optical device, metal films for bonding are provided on the surfaces of the transparent members. The members are bonded in a state where the metal films are superimposed on each other to obtain an optical device.

Further, as the optical device, for example, there is also proposed a device formed in a state where a plurality of transparent members are bonded while forming an interior space in a path portion for transmitting the light (see for example Patent Literature 1).

Further, where an optical device configured by bonding a plurality of transparent members is produced, for example, use is made of a mask configured by a frame member, pattern portions for forming shapes of interior spaces, and arms for connecting the pattern portions and the frame member. The mask is superimposed on the transparent member. In that state, metal film is formed in the clearances of the mask.

In this case, metal film is not provided at the arm portions. Therefore, for example, recessed portions which are communicated with the outside as disclosed in Patent Literature 2 are formed.

CITATIONS LIST

Patent Literature

Patent Literature 1. Japanese Patent Publication No. H09-257567A

Patent Literature 2. Japanese Patent Publication No. H06-258611A

SUMMARY OF INVENTION

Technical Problem

In such a conventional optical device, the formation of a recessed portion in which the interior space and the outer space of the optical device are communicated means existence of a portion in which metal film is not provided on the transparent member, therefore there has been a risk of the metal film peeling off in when the device is used over a long period of time.

Further, the masks used for the transparent members to be bonded had the same shaped patterns, therefore portions without provision of metal film were superimposed and a route connecting the partial space and the interior space was formed in the transparent members, so sometimes the transparent member became stained in a high humidity/temperature usage environment.

Therefore, it is preferable to provide an optical device in which the problems described above are solved, the risk of peeling is reduced, and occurrence of staining is reduced.

And/or it is preferable to provide an optical device in which the problems described above are solved, the risk of peeling is reduced, and entry of foreign matter becomes harder.

Solution to Problem

In order to solve the above problems, according to first viewpoint of one aspect of the present invention, there is provided a method for producing an optical device which is configured by bonding two transparent members, the method using a first mask which is comprised of at least one first arm, a pattern portion which is connected with the first arm and is formed in a polygon shape or a circle shape, and a frame member which is connected to the pattern portion, and a second mask which is comprised of at least one second arm which is provided in a direction different from that of the first arm of the first mask, a pattern portion which is connected with the second arm and is formed in a polygon shape or a circle shape, and a frame member which is connected to the pattern portion; and including a first transparent member wafer metal film-forming step of superimposing the first mask on one transparent member wafer between two transparent member wafers each having portions which become pluralities of transparent members and forming a metal film between the pattern portions and the frame members, a second transparent member wafer metal film-forming step of superimposing the second mask on the other transparent member wafer and forming a metal film between the pattern portions and the frame members, a bonding step of making the metal film side of the one transparent member wafer and the metal film side of the other transparent member wafer face each other and bonding these wafers at a predetermined temperature and under a predetermined pressure, and a dicing step of dicing the bonded two transparent member wafers to form individual optical devices.

In order to solve the above problems, according to one aspect of the present invention, there is provided a method for producing an optical device which is configured by bonding two transparent members, the method using a first mask which is comprised of at least one first arm, a pattern portion which is connected with the first arm and is formed in a polygon shape or circle shape, and a frame member which is connected to the pattern portion, and a second mask which is comprised of at least one second arm which is provided in a direction different from that of the first arm of the first mask, a pattern portion which is connected with the second arm and is formed in a polygon shape or circle shape, and a frame member which is connected to the pattern portion; and including a first transparent member wafer metal film-forming step of superimposing the first mask or second mask on one transparent member wafer between the two transparent member wafers each having portions which become pluralities of transparent members and forming a first metal film between the pattern portions and the frame members, a second transparent member wafer metal film-forming step, after the first transparent member wafer metal film-forming step, of superimposing a mask which is not used in the first transparent member wafer metal film-forming step on the first metal film side of the one transparent member wafer and forming a second metal film between the pattern portions and the frame members, a third transparent member wafer metal film-forming step of superimposing the first mask or second mask on the other transparent member wafer and forming a third metal film between the pattern portions and the frame members, a fourth transparent member wafer metal film-forming step, after the third transparent member wafer metal film-forming step, of superimposing the mask which is not used in the third transparent member wafer metal film-forming step on the third metal film side of the other transparent member wafer and forming a fourth metal film between the pattern portions and the frame members, a bonding step of making the first and second metal film sides of the one transparent member wafer and the third and fourth metal film sides of the other transparent member wafer face each other and bonding these wafers at a predetermined temperature and under a predetermined pressure, and a dicing step of dicing the bonded two transparent member wafers to form individual optical devices.

Advantageous Effects of Invention

According to such methods for producing optical devices, the first mask and the second mask differ in patterns, therefore marks which are formed by the arms of the first mask and second mask are not superimposed on each other, so occurrence of staining at the transparent members can be reduced.

DESCRIPTION

Title of invention: Method for producing Optical Device

TECHNICAL FIELD

The present invention relates to a method for producing an optical device which is used in an optical instrument.

BACKGROUND ART

Conventionally, for optical instrument such as an optical communication, a measuring apparatus and a semiconductor laser, use has been made of an optical device such as an etalon, a halfwave plate and a quarterwave plate.

Some of these optical devices are comprised by bonding a plurality of transparent members with each other.

For example, when explaining an optical device of an etalon, there is proposed an air gap type which is configured by bonding two transparent members (see for example Patent Literature 1).

In such an optical device, metal films for bonding are provided on the surfaces of the transparent members. The members are bonded in a state where the metal films are superimposed on each other to obtain an optical device.

Further, as the optical device, for example, there is also proposed a device formed in a state where a plurality of transparent members are bonded while forming an interior space in a path portion for transmitting the light (see for example Patent Literature 1).

Further, where an optical device configured by bonding a plurality of transparent members is produced, for example, use is made of a mask configured by a frame member, pattern portions for forming shapes of interior spaces, and arms for connecting the pattern portions and the frame member. The mask is superimposed on the transparent member. In that state, metal film is formed in the clearances of the mask.

In this case, metal film is not provided at the arm portions. Therefore, for example, recessed portions which are communicated with the outside as disclosed in Patent Literature 2 are formed.

CITATIONS LIST

Patent Literature

Patent Literature 1. Japanese Patent Publication No. H09-257567A

Patent Literature 2. Japanese Patent Publication No. H06-258611A

SUMMARY OF INVENTION

Technical Problem

In such a conventional optical device, the formation of a recessed portion in which the interior space and the outer space of the optical device are communicated means existence of a portion in which metal film is not provided on the transparent member, therefore there has been a risk of the metal film peeling off in when the device is used over a long period of time.

Further, the masks used for the transparent members to be bonded had the same shaped patterns, therefore portions without provision of metal film were superimposed and a route connecting the partial space and the interior space was formed in the transparent members, so sometimes the transparent member became stained in a high humidity/temperature usage environment.

Therefore, it is preferable to provide an optical device in which the problems described above are solved, the risk of peeling is reduced, and occurrence of staining is reduced.

Therefore, it is preferable to provide an optical device in which the problems described above are solved, the risk of peeling is reduced, and entry of foreign matter becomes harder.

Solution to Problem

In order to solve the above problems, according to the present invention, there is provided a method for producing an optical device which is configured by bonding two transparent members, the method using a first mask which is comprised of at least one first arm, a pattern portion which is connected with the first arm and is formed in a polygon shape or a circle shape, and a frame member which is connected to the pattern portion, and a second mask which is comprised of at least one second arm which is provided in a direction different from that of the first arm of the first mask, a pattern portion which is connected with the second arm and is formed in a polygon shape or a circle shape, and a frame member which is connected to the pattern portion; and including a first transparent member wafer metal film-forming step of superimposing the first mask on one transparent member wafer between two transparent member wafers each having portions which become pluralities of transparent members and forming a metal film between the pattern portions and the frame members, a second transparent member wafer metal film-forming step of superimposing the second mask on the other transparent member wafer and forming a metal film between the pattern portions and the frame members, a bonding step of making the one transparent member wafer and the other transparent member wafer face each other and bonding these wafers at a predetermined temperature and under a predetermined pressure, and a dicing step of dicing the bonded two transparent member wafers to form individual optical devices.

Further, in order to solve the above problems, according to the present invention, there is provided a method for producing an optical device which is configured by bonding two transparent members, the method using a first mask which is comprised of an X-shaped arm, a pattern portion which is a crossed part of the X-shape and is formed in a polygon shape or a circle shape, and a frame member which is connected to the pattern portion, and a second mask which is comprised of a cross-shaped arm, a pattern portion which is a crossed part of the cross shape and is formed in a polygon shape or a circle shape, and a frame member which is connected to the pattern portion; and includes a first transparent member wafer metal film-forming step of superimposing the first mask on one transparent member wafer between two transparent member wafers each having portions which become pluralities of transparent members and forming a metal film between the pattern portions and the frame members, a second transparent member wafer metal film-forming step of superimposing the second mask on the other transparent member wafer and forming a metal film between the pattern portions and the frame members, a bonding step of superimposing one transparent member wafer and the other transparent member wafer on each other and bonding them at a predetermined temperature and under a predetermined pressure, and a dicing step of dicing the bonded two transparent member wafers to form individual optical devices.

Further, in the present invention, a reflection film may be provided on one major surface of the transparent member, an anti-reflection film may be provided on the other major surface of the transparent member, and the metal film may be provided on the anti-reflection film.

Further, in the present invention, the metal film may be provided by sputtering or vapor deposition.

Advantageous Effects of Invention

According to such methods for producing optical devices, the first mask and the second mask differ in patterns, therefore marks which are formed by the arms of the first mask and second mask are not superimposed on each other, so occurrence of staining at the transparent members can be reduced.

BRIEF DESCRIPTION OF DRAWINGS

FIG. 2A is a perspective view which shows a state before a first mask is superimposed on one transparent member wafer, while

FIG. 4A is a perspective view which shows a state before a second mask is superimposed on another transparent member wafer, while

FIG. 6A is a perspective view which shows a state before the one transparent member wafer and the other transparent member wafer are bonded, while

FIG. 8A is a perspective view which shows a state before a first mask is superimposed on one transparent member wafer, while

FIG. 10A is a perspective view which shows a state before a second mask is superimposed on another transparent member wafer, while

FIG. 12A is a perspective view which shows a state before the one transparent member wafer and the other transparent member wafer are bonded, while

FIG. 13A is a perspective view which shows an example of an optical device according to a third embodiment of the present invention, while

FIG. 17A is a perspective view which shows a state before the one transparent member wafer and the other transparent member wafer are bonded, while

FIG. 18A is a perspective view which shows an example of an optical device according to a fourth embodiment of the present invention, while

FIG. 23A is a perspective view which shows a state before the one transparent member wafer and the other transparent member wafer are bonded, while

DESCRIPTION OF EMBODIMENTS

Figure 1:
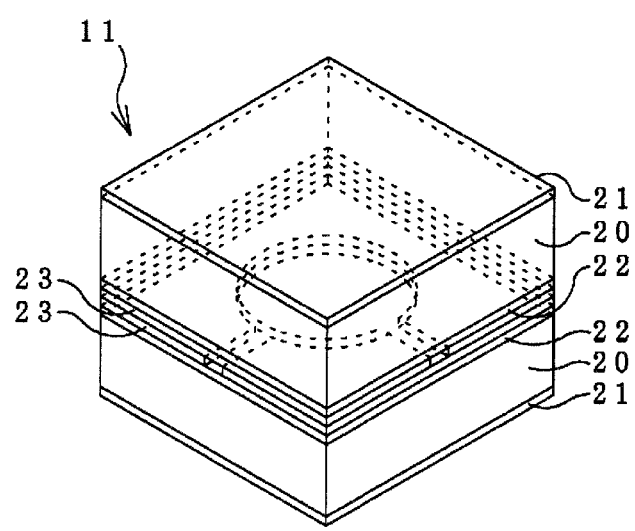
FIG. 1 is a perspective view which shows an example of an optical device according to a first embodiment of the present invention.

Next, best modes for working the present invention (hereinafter referred to as "embodiments") will be explained in detail by suitably referring to the drawings. Note that, the components will be shown exaggerated for making the state easier to understand.

Note that, the surfaces upon which light is incident and from which light is emitted will be referred to as the "major surfaces", while surfaces surrounding the major surfaces will be referred to as "side surfaces".

First Embodiment (Optical Device)

As shown in FIG. 1, an optical device 11 which is produced by a method for producing an optical device according to a first embodiment of the present invention is for example configured by bonding two transparent members 20 and 20.

For the transparent members 20, for example, use is made of square-shaped, flat plate-shaped members made of a transparent material which are formed to uniform thicknesses. For example, use is made of glass, quartz crystal, etc. Note that, the transparent members 20 may exhibit trapezoidal shapes when viewed from the side surface side. Note that, the transparent members 20 in the other embodiments which will be explained later are same as the transparent members 20 in the first embodiment for matters which are not particularly explained.

In each of these transparent members 20, a reflection film 21 is provided on one major surface, and an anti-reflection film 22 is provided on the other major surface.

On the anti-reflection films 22 of these transparent members 20, metal films 23 are provided except at the central part of the major surface and at least two straight lines extending outward from the central part.

The metal film 23 is made of a single metal or an alloy having a positive free energy of formation of an oxide at room temperature and is formed in a thin film state. This metal film 23 is comprised of for example Ta, Cr, Ti, Ni, or the like which is used as the foundation metal and Au, Pt, gold alloy, or another single metal or alloy having a positive free energy of formation of an oxide at room temperature which is formed on the foundation metal. Further, the metal film 23 is provided with a thickness of 0.2 nm or more. Note that, the metal films 23 in the other embodiments which will be explained later are same as the metal film 23 in the first embodiment for matters which are not particularly explained.

A method for producing such an optical device according to the first embodiment of the present invention will be explained.

The method for producing this optical device according to the first embodiment of the present invention is comprised of, as shown in FIGS. 2A and 2B to FIGS. 6A and 6B, a first transparent member wafer metal film-forming step, a second transparent member wafer metal film-forming step, a bonding step, and a dicing step.

Figure 2A:
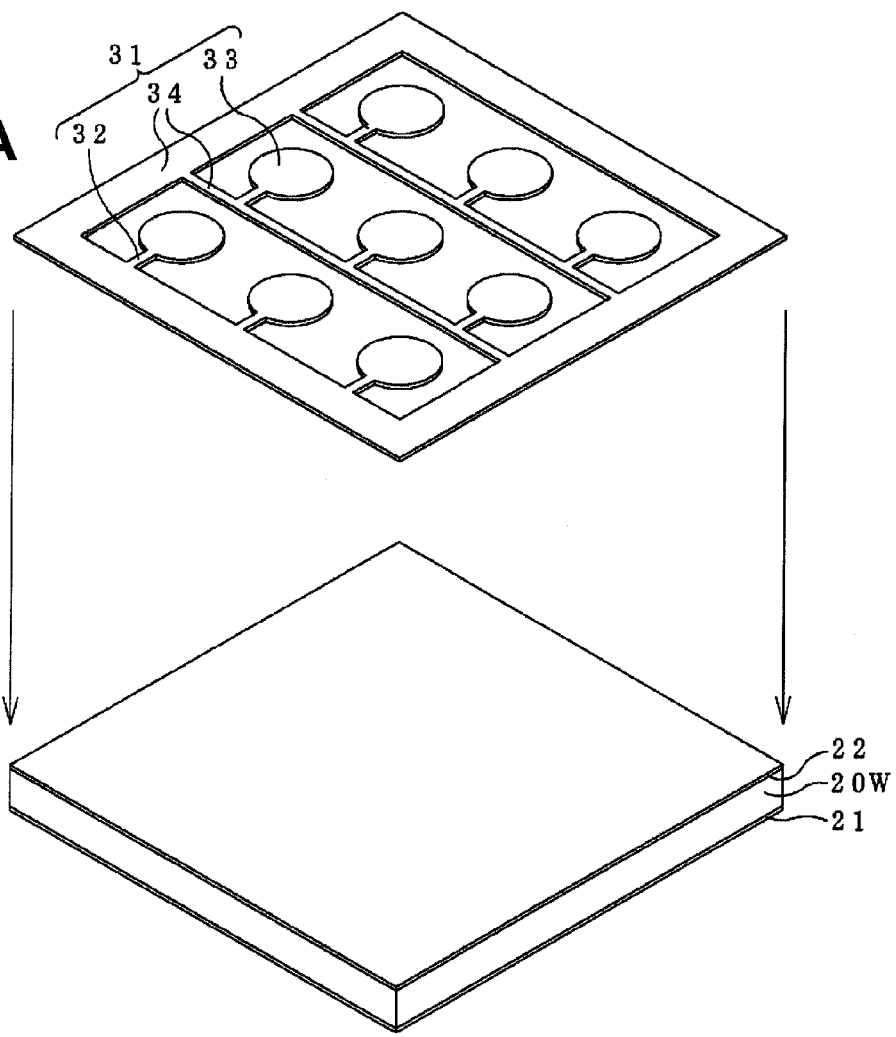
Figure 2B:
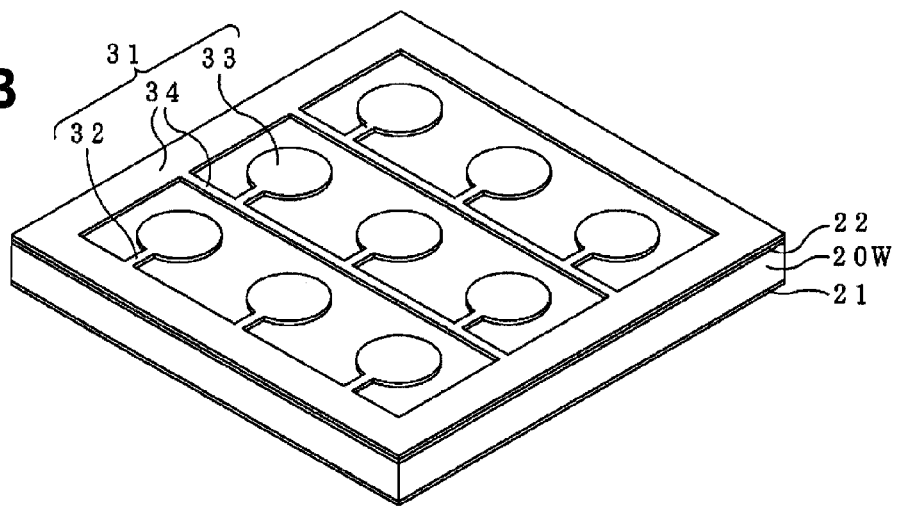
FIG. 2B is a perspective view which shows a state after the first mask is superimposed on the one transparent member wafer.

As shown in FIG. 2A, first, two masks having different patterns are prepared.

A first mask 31 is configured by at least one first arm 32, a pattern portion 33 which is connected with the first arm 32 and is formed in a polygon shape or a circle shape, and a frame member 34 which is connected to the pattern portion.

In this case, it is deemed that the first arm 32 of the first mask 31 is configured having one arm portion. Further, it is deemed that the first mask 31 is provided with the circular pattern portion 33 at the center of the frame member 34. The pattern portion 33 and the frame member 34 are connected by the first arm 32. A plurality of these shapes are provided.

Note that, the first mask 31 may be configured so that the width of the first arm 32 is for example 100 µm.

Figure 4A:
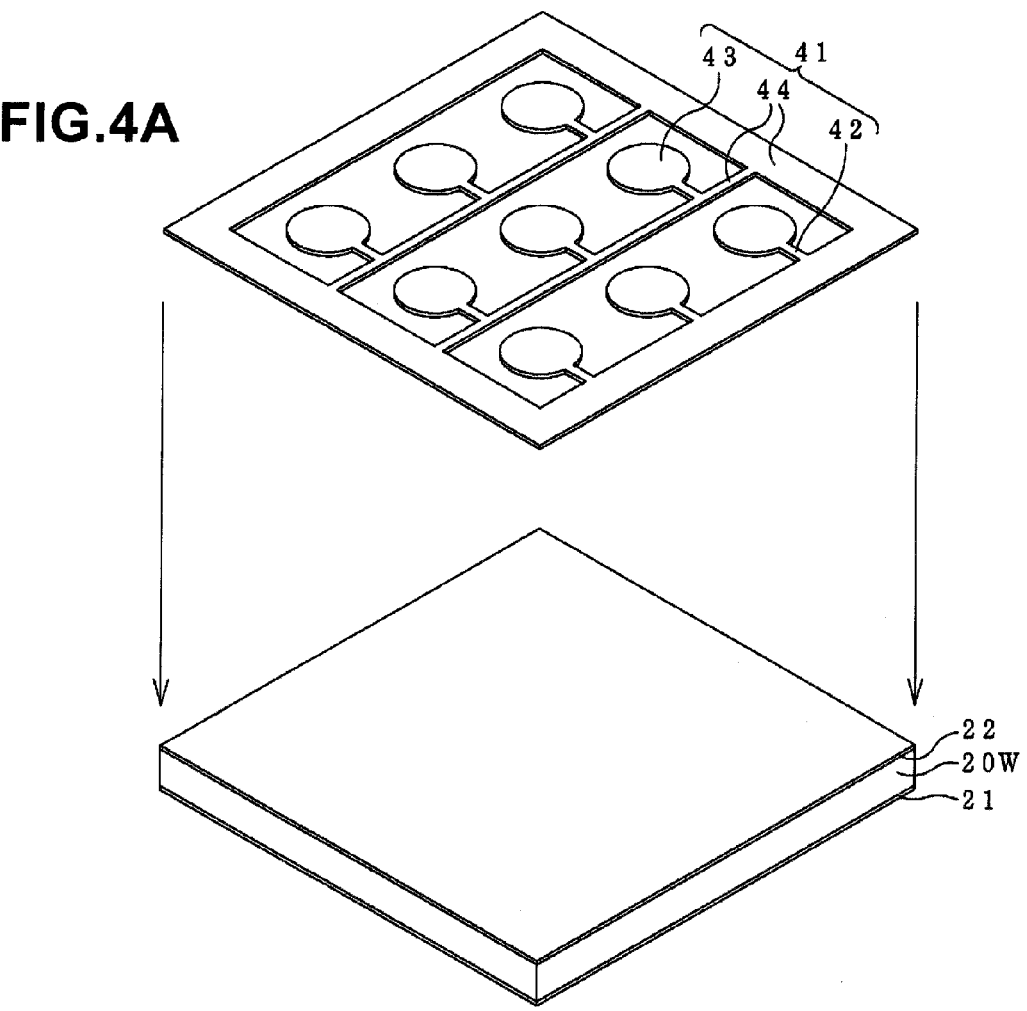
Figure 4B:
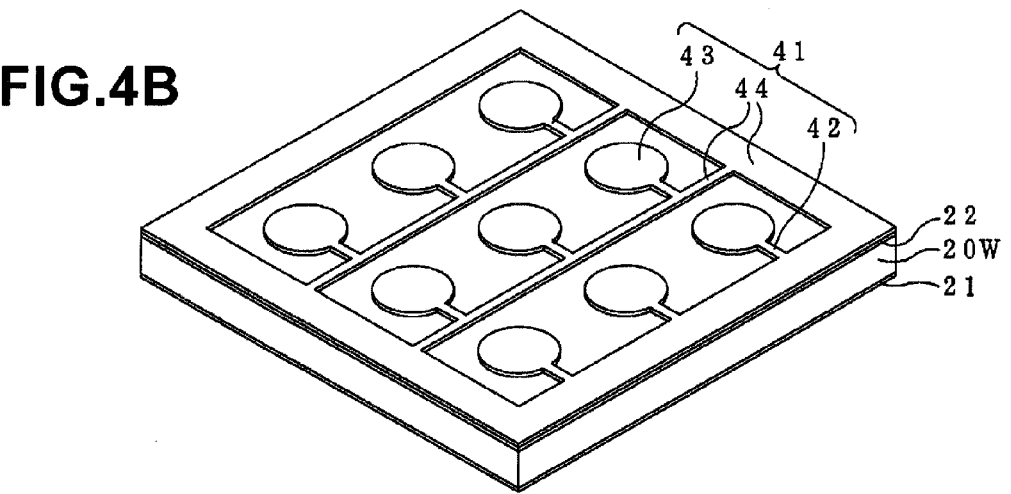
FIG. 4B is a perspective view which shows a state after the second mask is superimposed on another transparent member wafer.

As shown in FIG. 4A, a second mask 41 is configured by at least one second arm 42 which is provided in a direction different from the first arm 32 in the first mask 31, a pattern portion 43 which is connected with the arm 42 and is formed in a polygon shape or a circle shape, and a frame member 44 which is connected to the pattern portion 43.

In this case, it is deemed that the second arm 42 of the second mask 41 is configured having one arm portion. Further, it is deemed that the second mask 41 is provided with the circular pattern portion 43 at the center of the frame member 44. This pattern portion 43 and the frame member 44 are connected by the second arm 42. A plurality of these shapes are provided.

Note that, the second mask 41 may be configured so that the width of the second arm 42 is for example 100 µm.

Next, transparent member wafers 20W which become the transparent members 20 are prepared. In each of the transparent member wafers 20W, a reflection film 21 is provided on one major surface, and an anti-reflection film 22 is provided on the other major surface.

(First Transparent Member Wafer Metal Film-Forming Step)

Figure 3:
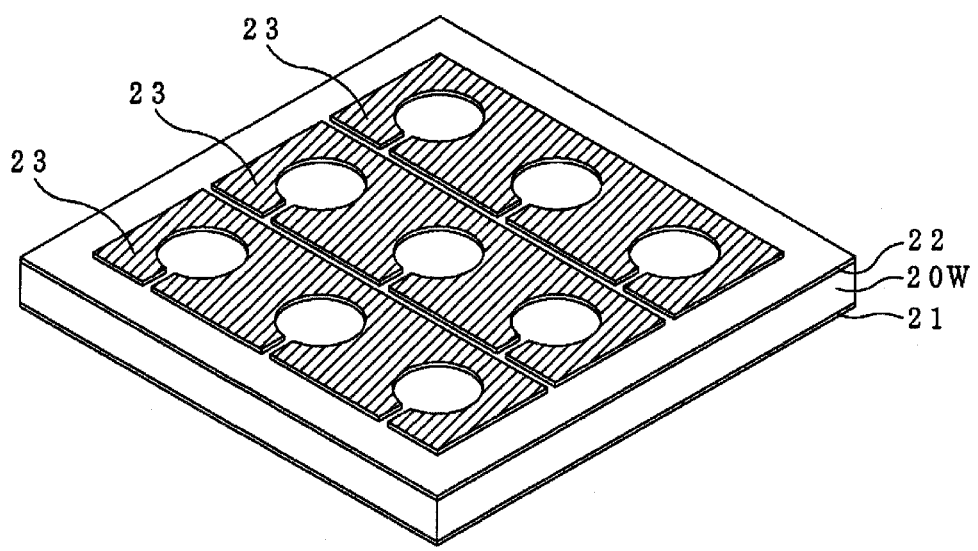
FIG. 3 is a perspective view which shows an example of provision of a metal film on the one transparent member wafer.

The first transparent member wafer metal film-forming step, as shown in FIGS. 2A and 2B to FIG. 3, is a step of superimposing the first mask 31 on one transparent member wafer 20W between two transparent member wafers 20W each having the anti-reflection film 22 provided on one major surface and having the reflection film 21 provided on the other major surface (see FIG. 2B) and forming a metal film 23 between the pattern portions 33 and the frame members 34 (see FIG. 3).

By this first transparent member wafer metal film-forming step, the state where the metal film 23 is formed on the anti-reflection film 22 is exhibited. At this time, the transparent member wafer 20W becomes a state where the metal film 23 is not provided at the portions at which the first arms 32 and pattern portions 33 of the first mask 31 were superimposed, but the metal film 23 is provided at openings formed by the frame members 34, pattern portions 33, and first arms 32.

When providing the metal film, although not shown, use is made of sputtering or vapor deposition. Due to this, metal film 23 having a predetermined thickness can be provided on the anti-reflection film 22 of the transparent member 20.

(Second Transparent Member Wafer Metal Film-Forming Step)

Figure 5:
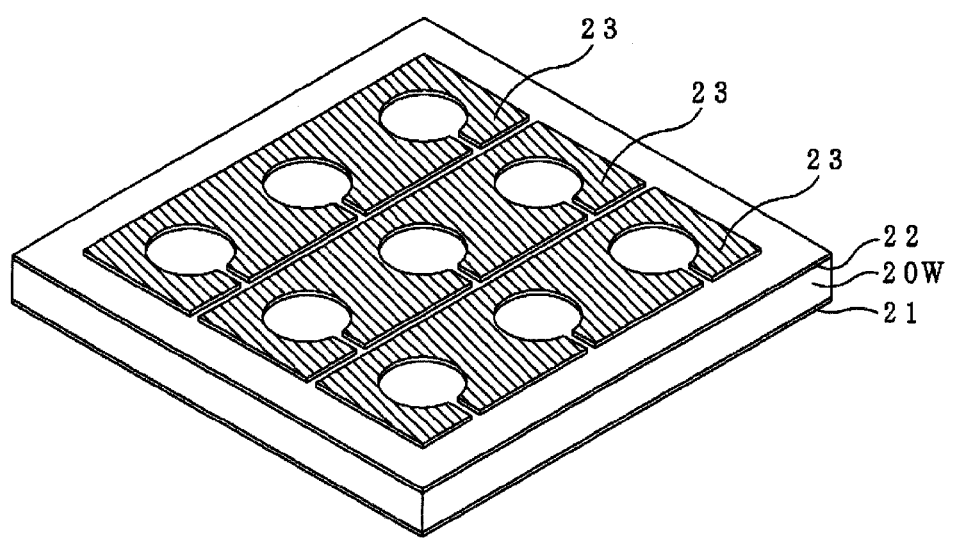
FIG. 5 is a perspective view which shows an example of provision of a metal film on another transparent member wafer.

The second transparent member wafer metal film-forming step, as shown in FIGS. 4A and 4B to FIG. 5, is a step of superimposing the second mask 41 on the other transparent member wafer 20W (see FIG. 4B) and forming a metal film 23 between the pattern portions 43 and the frame members 44 (see FIG. 5).

By this second transparent member wafer metal film-forming step, the state where the metal film 23 is provided on the anti-reflection film 22 is exhibited. At this time, the transparent member wafer 20W becomes a state where the metal film 23 is not provided at the portions at which the second arms 42 and pattern portions 43 of the second mask 41 were superimposed, but the metal film 23 is provided at openings formed by the frame members 44, pattern portions 43, and first arms 42. Further, the first arms 32 and the second arms 42 differ in directions in which they extend from the centers of the frame members 34 and 44. Therefore, in the second transparent member wafer metal film-forming step, the portions at which the second arms 42 are superposed are prevented from being superposed over the portions at which the first arms 32 were superposed in the first transparent member wafer metal film-forming step.

When providing the metal film 23, use is made of sputtering or vapor deposition. Due to this, metal film 23 having a predetermined thickness can be provided on the anti-reflection film 22 of the transparent member 20.

(Bonding Step)

Figure 6A:
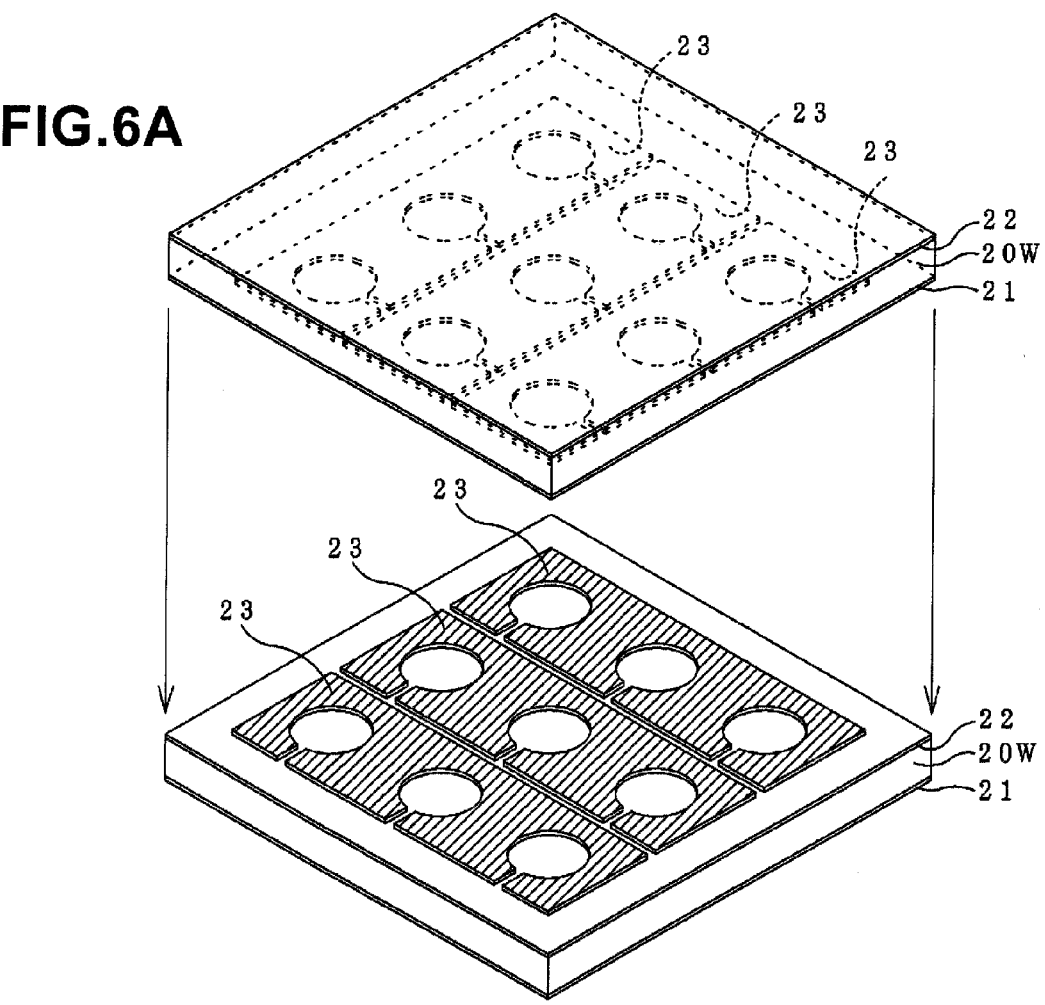
Figure 6B:
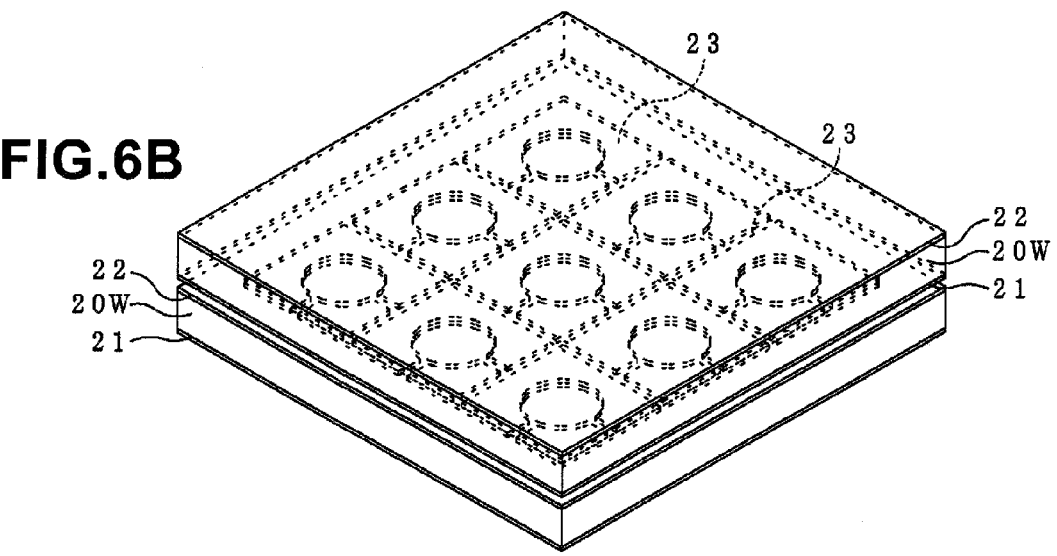
FIG. 6B is a perspective view which shows an example of a state after the one transparent member wafer and the other transparent member wafer are bonded.

The bonding step, as shown in FIGS. 6A and 6B, is the step of superimposing one transparent member wafer 20W and the other transparent member wafer 20W and bonding them at a predetermined temperature and under a predetermined pressure.

In this bonding step, the metal film 23 provided on one transparent member wafer 20W and the metal film 23 provided on the other transparent member wafer 20W are superimposed, and are bonded at the predetermined temperature and under the predetermined pressure. Note that, for bonding, for example, use can be made of atomic diffusion bonding.

Due to this, one transparent member wafer 20W and the other transparent member wafer 20W are bonded, therefore bonded transparent member wafers 20W including a plurality of optical devices 11 can be formed.

(Dicing Step)

The dicing step is a step of dicing the bonded two transparent member wafers 20W and 20W to form individual optical devices 11. For dicing, use can be made of a rotating blade or the like.

In this dicing step, individual optical devices can be obtained by cutting the wafers into pieces each having a predetermined size so that the portions on which the pattern portions 33 of the first mask 31 and the pattern portions 43 of the second mask 41 are superimposed become the centers.

Since the method for producing the optical device was configured in this way, the first mask 31 and the second mask 41 differ in patterns, and the marks which are formed by the arms 32 and 42 of the first mask 31 and second mask 41 are not superimposed on each other, so staining can be reduced. Further, the metal films 23 are formed on the surfaces of the transparent members 20 which face the portions which become the marks which are formed by the arms 32 and 42 of the first mask 31 and the second mask 41, therefore it is possible to make the peeling harder.

Second Embodiment

An optical device 12 which is produced by the method for producing an optical device according to a second embodiment of the present invention differs from the first embodiment in the point that marks which are formed by first arms 52 of a first mask 51 and marks which are formed by second arms 62 of a second mask 61 differ from each other.

(Optical Device)

Figure 7:
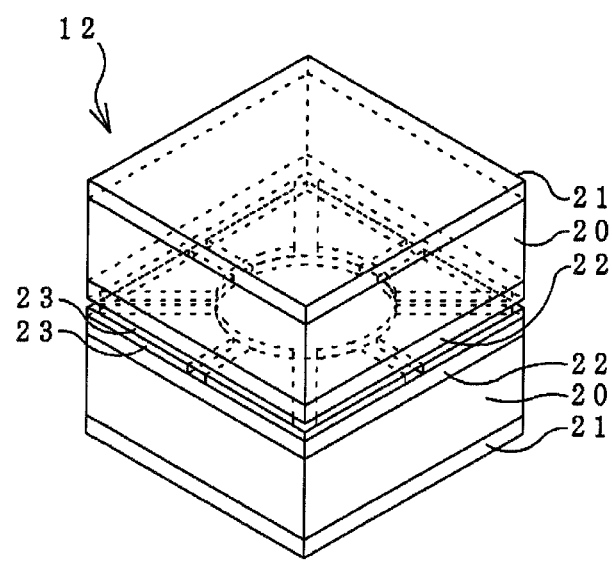
FIG. 7 is a perspective view which shows an example of an optical device according to a second embodiment of the present invention.

As shown in FIG. 7, the optical device 12 produced by the method for producing an optical device according to the second embodiment of the present invention is for example configured by bonding two transparent members 20 and 20.

In each transparent member 20, a reflection film 21 is provided on one major surface, and an anti-reflection film 22 is provided on the other major surface.

On the anti-reflection film 22 of this transparent member 20, a metal film 23 is provided except at the central part of the major surface and eight straight lines radially extending outward from that central part.

The method for producing such an optical device according to the second embodiment of the present invention will be explained.

The method for producing the optical device according to the second embodiment of the present invention, as shown in FIGS. 8A and 8B to FIGS. 12A and 12B, is comprised of a first transparent member wafer metal film-forming step, a second transparent member wafer metal film-forming step, a bonding step, and a dicing step.

First, two masks having different patterns are prepared.

Figure 8A:
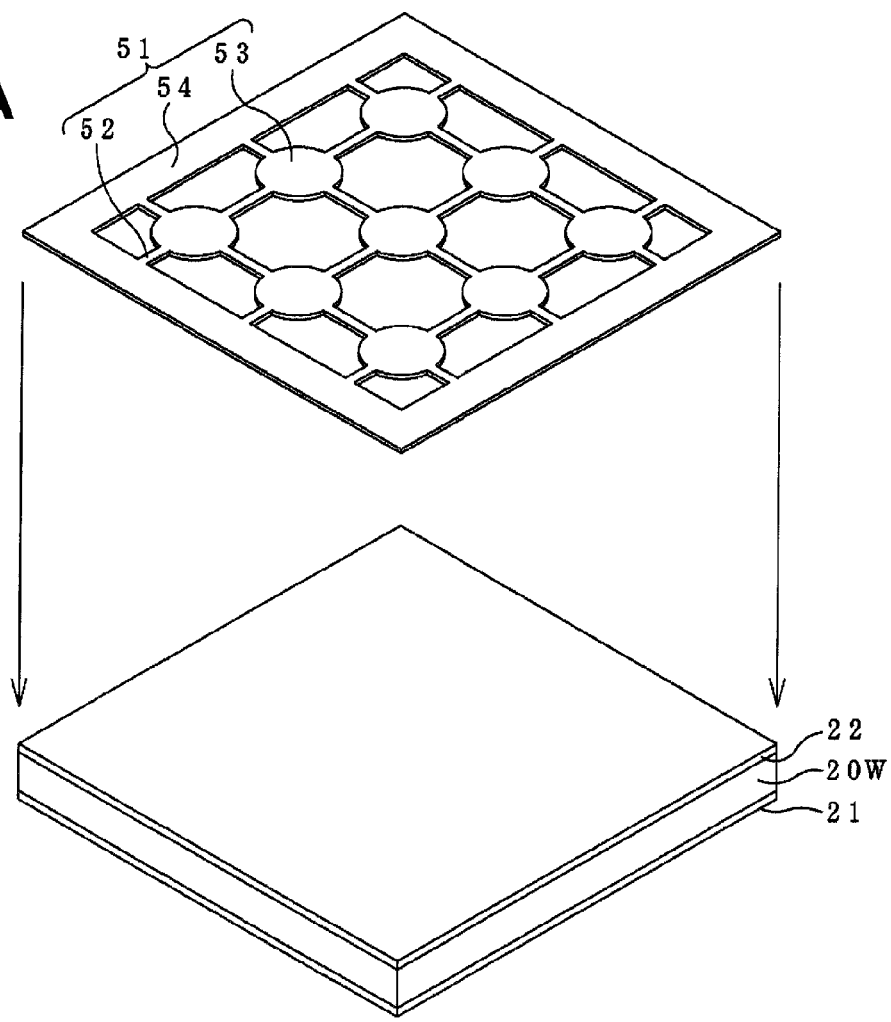
Figure 8B:
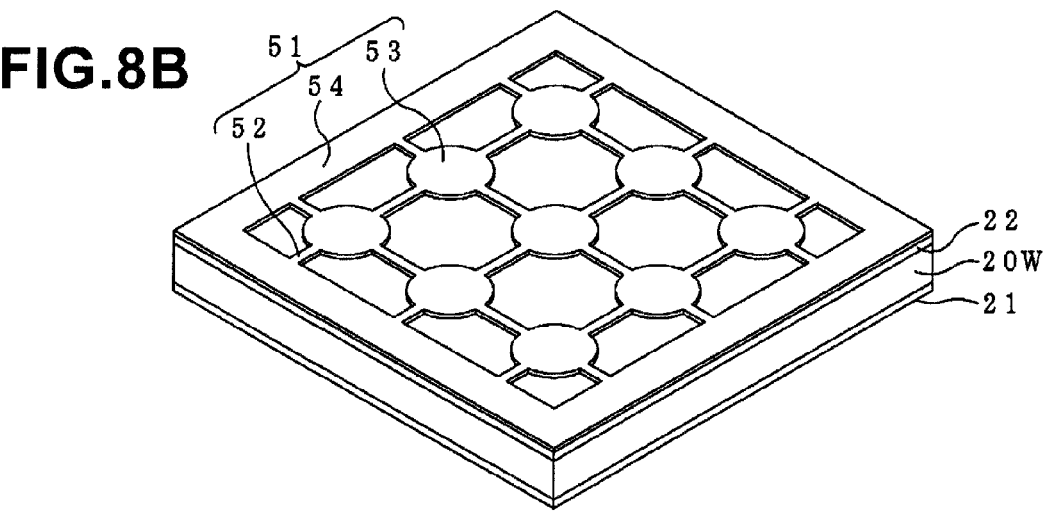
FIG. 8B is a perspective view which shows a state after the first mask is superimposed on the one transparent member wafer.

As shown in FIG. 8A, the first mask 51 is configured by a X-shaped first arm 52, a pattern portion 53 which forms a crossed part of the X-shape and which is formed in a polygon shape or a circle shape, and a frame member 54 which is connected to the pattern portion 53.

In this case, in the first mask 51, it is deemed that the circular pattern portion 53 is provided at the center of the frame member 54. This pattern portion 53 and the frame member 54 are connected by the first arm 52. A plurality of these shapes are provided.

Note that, the first mask 51 may be configured so that the width of the first arm 52 is for example 100 μm.

Figure 10A:
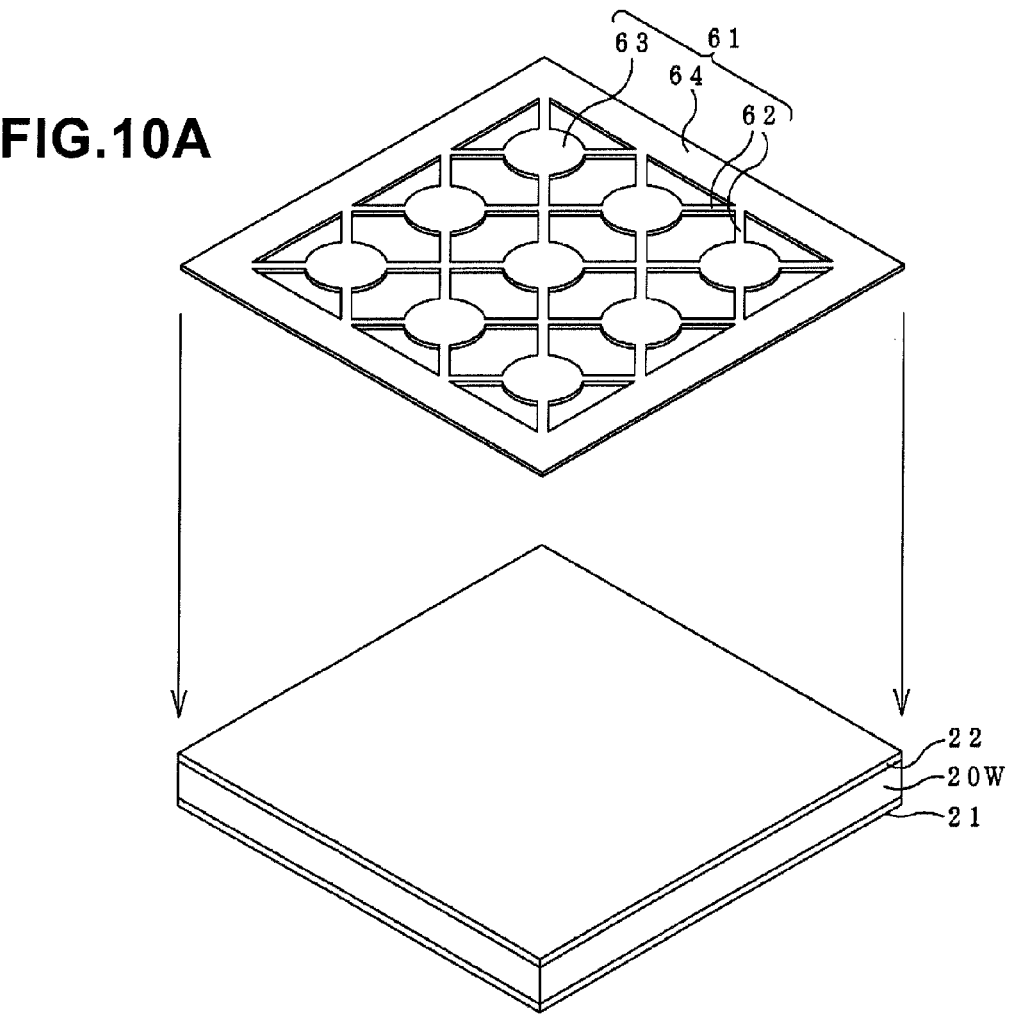
Figure 10B:
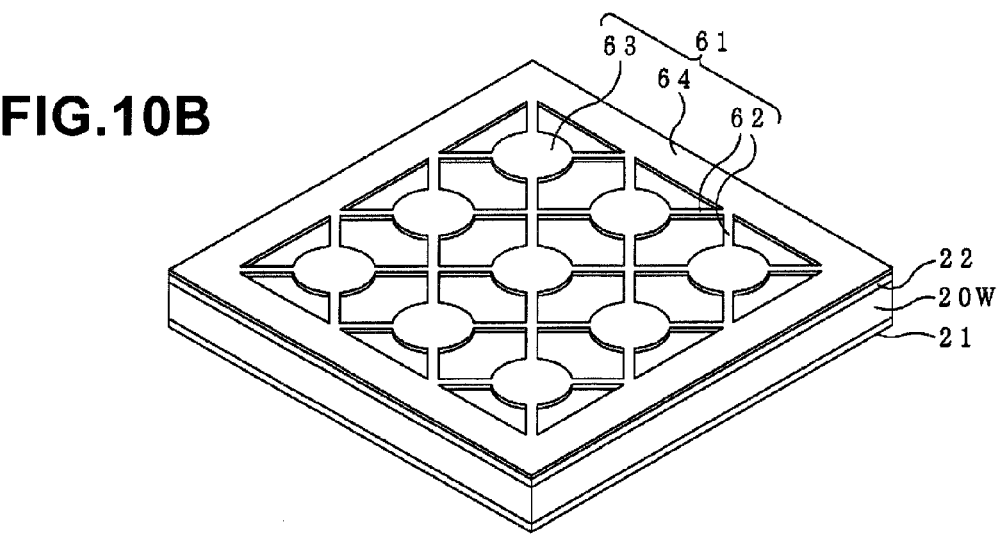
FIG. 10B is a perspective view which shows a state after the second mask is superimposed on another transparent member wafer.

As shown in FIG. 10A, a second mask 61 is configured by one cross-shaped second arm 62, a pattern portion 63 which is forms a crossed part of the cross and which is formed in a polygon shape or a circle shape, and a frame member 64 which is connected to this pattern portion 63.

In this case, in the second mask 61, it is deemed that the circular pattern portion 63 is provided at the center of the frame member 64. This pattern portion 63 and the frame member 64 are connected by the second arm 62. A plurality of these shapes are provided.

Note that, the second mask 61 may be configured so that the width of the second arm 62 is for example 100 μm.

Next, transparent member wafers 20W which become the transparent members 20 are prepared. In each of the transparent member wafers 20W, a reflection film 21 is provided on one major surface, and an anti-reflection film 22 is provided on the other major surface.

(First Transparent Member Wafer Metal Film-Forming Step)

Figure 9:
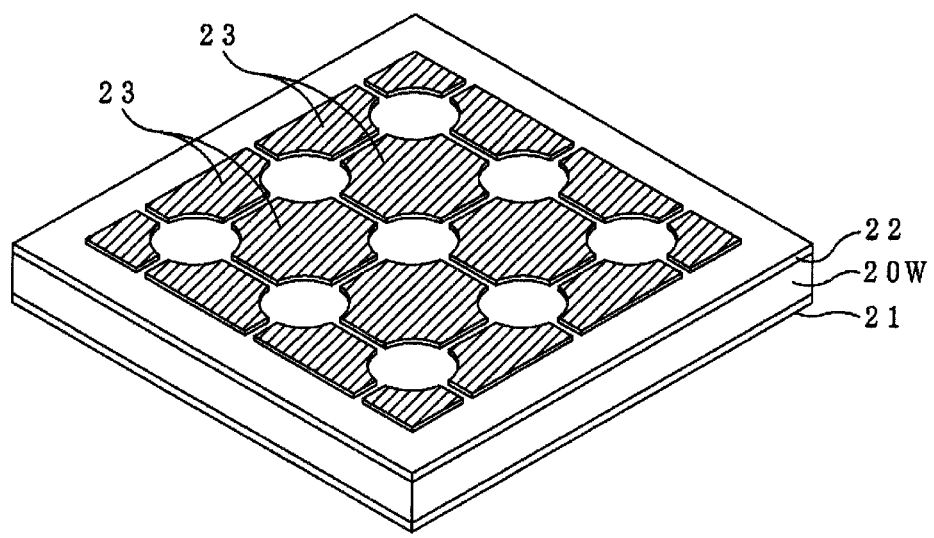
FIG. 9 is a perspective view which shows an example of provision of a metal film on the one transparent member wafer.

The first transparent member wafer metal film-forming step is a step of superimposing the first mask 51 on one transparent member wafer 20W between two transparent member wafers 20W each having the anti-reflection film 22 provided on one major surface and having the reflection film 21 provided on the other major surface (see FIG. 8B) and forming a metal film 23 between the pattern portions 53 and the frame members 54 (see FIG. 9).

By this first transparent member wafer metal film-forming step, the state where the metal film 23 is formed on the anti-reflection film 22 is exhibited. At this time, the transparent member wafer 20W becomes a state where the metal film 23 is not provided at the portions at which the first arms 52 and pattern portions 53 of the first mask 51 were superimposed, but the metal film 23 is provided at openings formed by the frame members 54, pattern portions 53, and first arms 52. That is, the metal film 23 is provided while leaving patterns of four straight lines radially extending so as to connect the circle shape and corners of the transparent member 20.

When providing the metal film 23, although not shown, use is made of sputtering or vapor deposition. Due to this, metal film 23 having a predetermined thickness can be provided on the anti-reflection film 22 of the transparent member 20.

(Second Transparent Member Wafer Metal Film-Forming Step)

Figure 11:
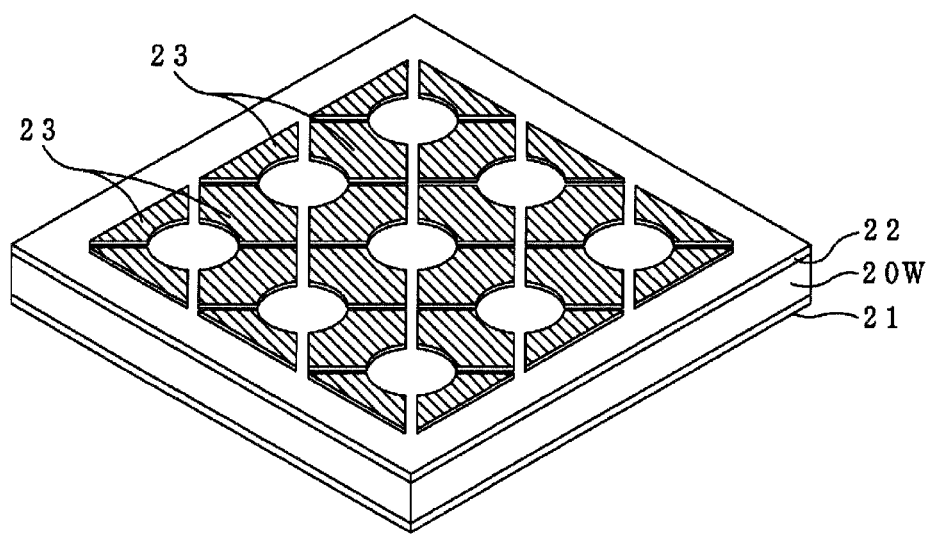
FIG. 11 is a perspective view which shows an example of provision of a metal film on another transparent member wafer.

The second transparent member wafer metal film-forming step is a step of superimposing the second mask 61 on the other transparent member wafer 20W (see FIG. 10B) and forming a metal film 23 between the pattern portions 63 and the frame members 64 (see FIG. 11).

By this second transparent member wafer metal film-forming step, the state where the metal film 23 is provided on the anti-reflection film 22 is exhibited. At this time, the transparent member wafer 20W becomes a state where the metal film 23 is not provided at the portions at which the second arms 62 and pattern portions 63 of the second mask 61 were superimposed, but the metal film 23 is provided at openings formed by the frame members 64, pattern portions 63, and second arms 62. Further, the first arms 52 and the second arms 62 differ in directions in which they extend from the centers of the frame members 54 and 64. Therefore, in the second transparent member wafer metal film-forming step, the portions at which the second arms 62 are superposed are prevented from being superposed over the portions at which the first arms 52 were superposed in the first transparent member wafer metal film-forming step. That is, the metal film 23 is provided while leaving patterns of four straight lines radially extending so as to connect the circle shape and the centers of the parallel sides of the transparent member 20.

When providing the metal film 23, although not shown, use is made of sputtering or vapor deposition. Due to this, metal film 23 having a predetermined thickness can be provided on the anti-reflection film 22 of the transparent member 20.

(Bonding Step)

Figure 12A:
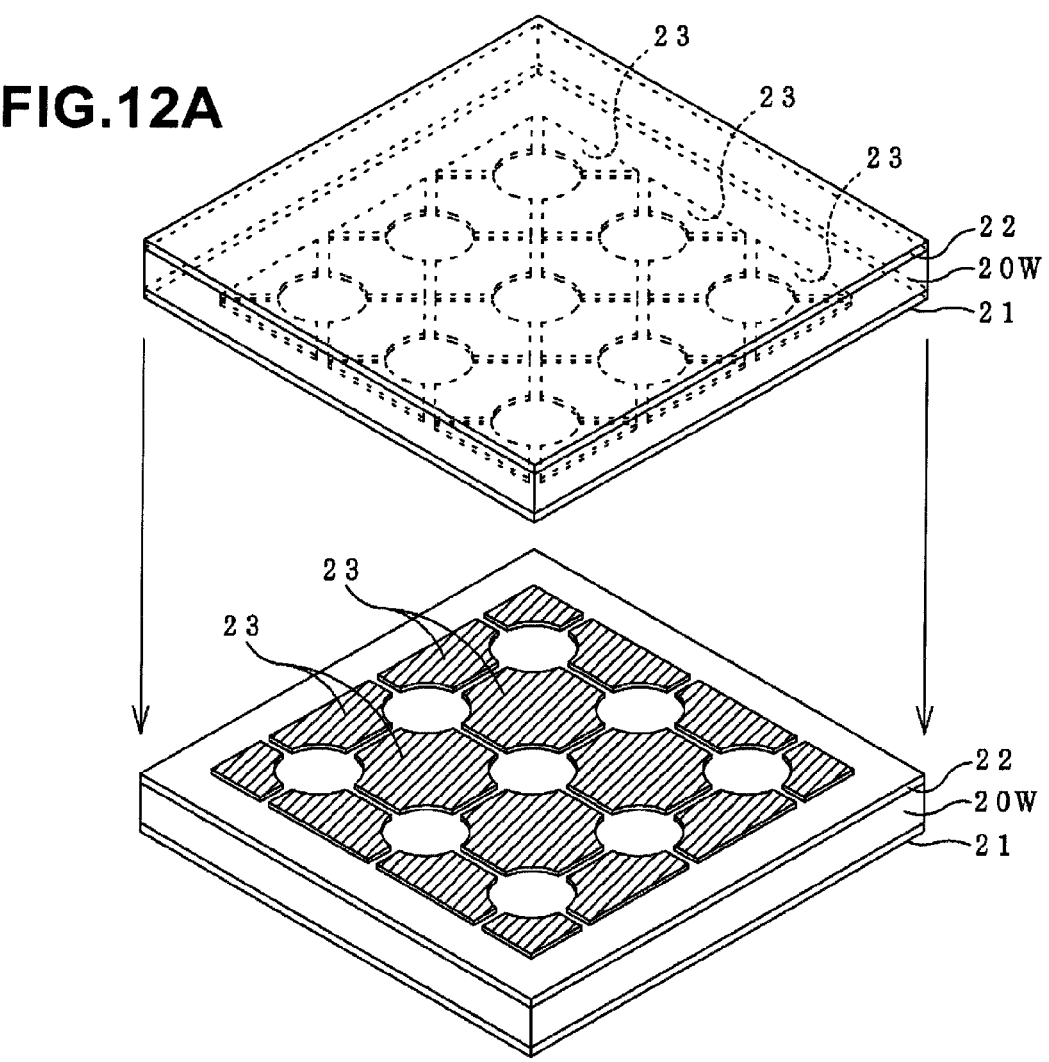
Figure 12B:
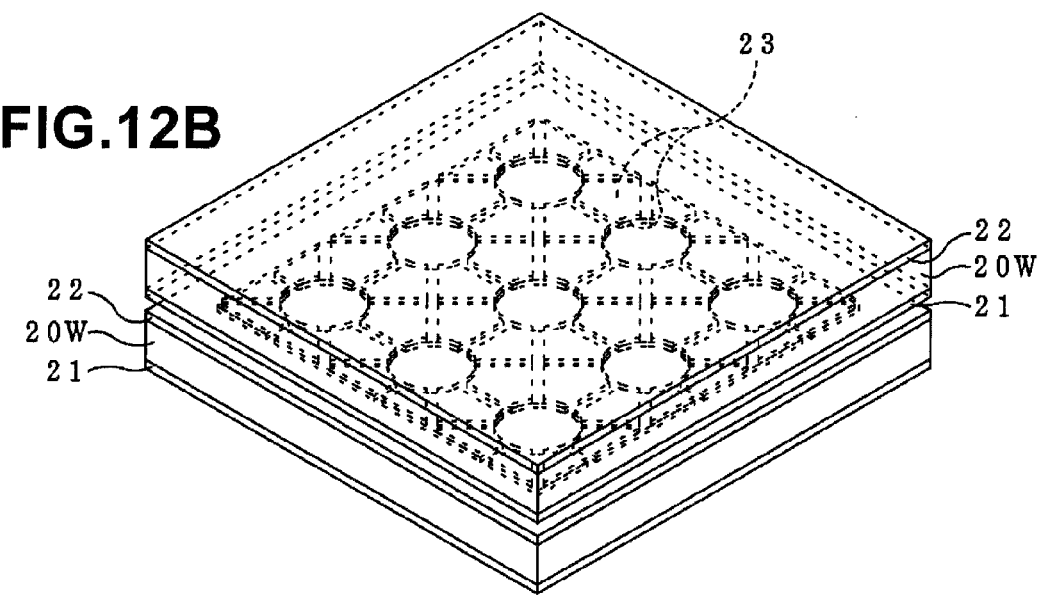
FIG. 12B is a perspective view which shows an example of a state after one transparent member wafer and the other transparent member wafer are bonded.

The bonding step, as shown in FIGS. 12A and 12B, is the step of superimposing one transparent member wafer 20W and the other transparent member wafer 20W and bonding them at a predetermined temperature and under a predetermined pressure.

In this bonding step, the metal film 23 provided on one transparent member wafer 20W and the metal film 23 provided on the other transparent member wafer 20W are superimposed, and are bonded at the predetermined temperature and under the predetermined pressure. Note that, for bonding, for example, use can be made of atomic diffusion bonding.

Due to this, one transparent member wafer 20W and the other transparent member wafer 20W are bonded, therefore bonded transparent member wafers 20W including a plurality of optical devices 12 can be formed.

(Dicing Step)

The dicing step is a step of dicing the bonded two transparent member wafers to form individual optical devices 12. For dicing, use can be made of a rotating blade or the like.

In this dicing step, individual optical devices can be obtained by cutting the wafers into pieces each having a predetermined size so that the portions on which the pattern portions 53 of the first mask 51 and the pattern portions 63 of the second mask 61 are superimposed become the centers.

Since the method for producing the optical device was configured in this way, the first mask and the second mask differ in patterns, and the marks which are formed by the arms of the first mask and second mask are not superimposed on each other, so staining can be reduced. Further, the metal films are formed on the surfaces of the transparent members which face the portions which become marks which are formed by the arms of the first mask and second mask, therefore it is possible to make the peeling harder.

Third Embodiment (Optical Device)

Figure 13A:
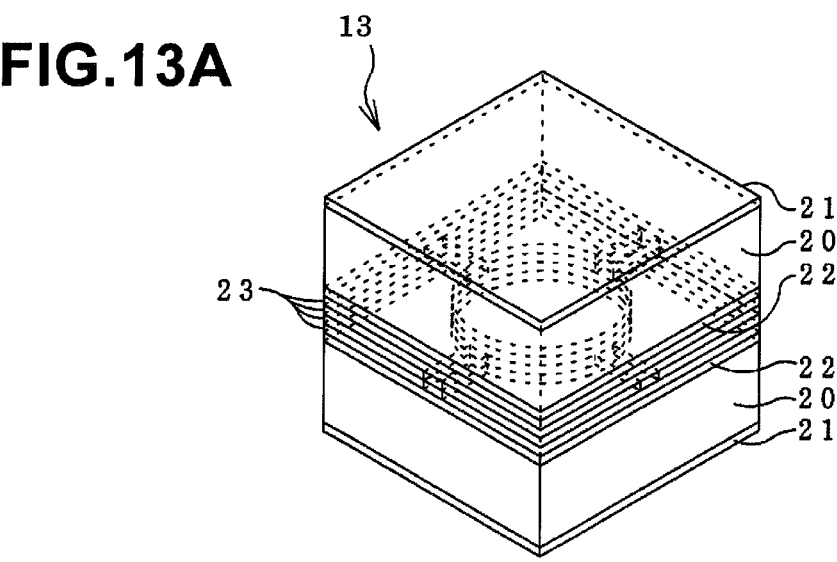
Figure 13B:
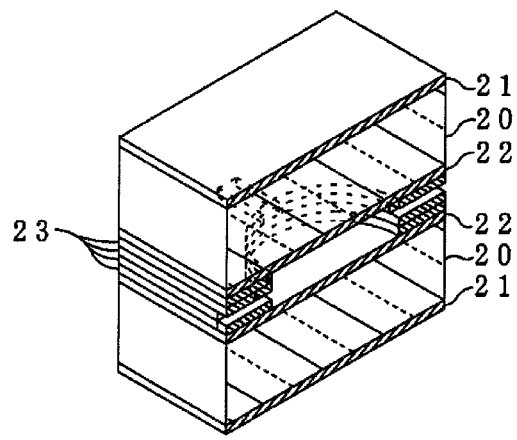
FIG. 13B is a cross-sectional view of FIG. 13A.

As shown in FIGS. 13A and 13B, the optical device 13 produced by the method for producing an optical device according to the third embodiment of the present invention is for example configured by bonding two transparent members 20 and 20.

In each transparent member 20, a reflection film 21 is provided on one major surface, and an anti-reflection film 22 is provided on the other major surface.

On the anti-reflection film 22 of this transparent member 20, a metal film 23 is provided except at the central part of the major surface and four straight lines radially extending outward from that central part.

The method for producing such an optical device according to the third embodiment of the present invention will be explained.

The method for producing the optical device according to the third embodiment of the present invention, as shown in FIGS. 2A and 2B, FIG. 3, and FIG. 14 to FIGS. 17A and 17B, is comprised of a first transparent member wafer metal film-forming step, a second transparent member wafer metal film-forming step, a third transparent member wafer metal film-forming step, a fourth transparent member wafer metal film-forming step, a bonding step, and a dicing step.

Figure 14:
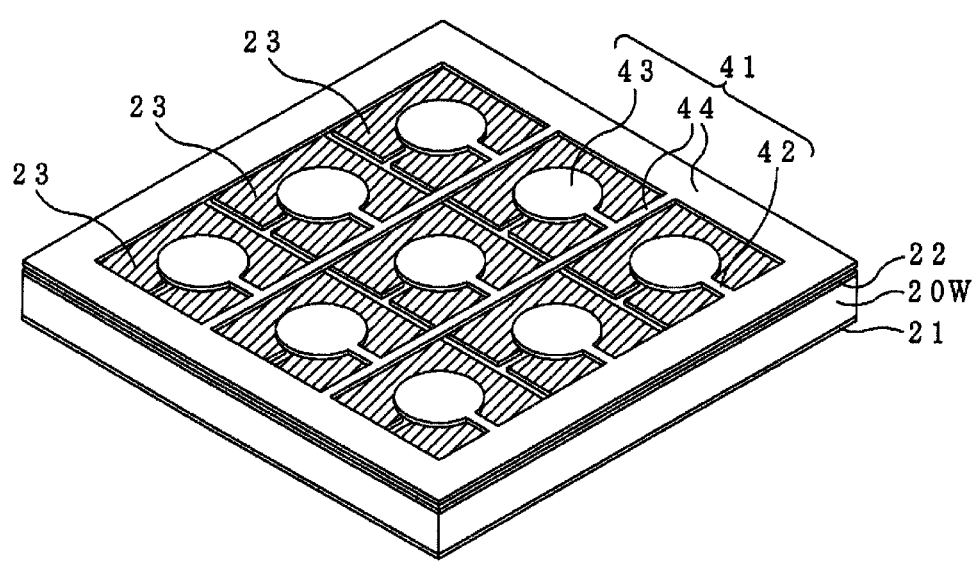
FIG. 14 is a perspective view which shows a state where a second mask is superimposed on one transparent member wafer.

First, two masks having different patterns are prepared. As shown in FIG. 2A, it is deemed that the first mask 31 is the first mask 31 which was explained in the first embodiment. As shown in FIG. 14, it is deemed that the second mask 41 is the second mask 41 which was explained in the first embodiment.

Next, as shown in FIG. 2A, transparent member wafers which become the transparent members 20 are prepared. In each of the transparent member wafers, a reflection film 21 is provided on one major surface, and an anti-reflection film 22 is provided on the other major surface.

(First Transparent Member Wafer Metal Film-Forming Step)

The first transparent member wafer metal film-forming step is a step of superimposing the first mask 31 or second mask 41 on one transparent member wafer 20W between two transparent member wafers 20W each having the anti-reflection film 22 provided on one major surface and having the reflection film 21 provided on the other major surface and forming a metal film 23 between the pattern portions and the frame members. Note that, in the present embodiment, the case of using the first mask 31 will be explained (for example, see FIG. 2B).

By this first transparent member wafer metal film-forming step, the state where the metal film 23 is formed on the anti-reflection film 22 is exhibited. At this time, as shown in FIG. 3, the transparent member wafer 20W becomes a state where the metal film 23 is not provided at the portions at which the first arms 32 and pattern portions 33 of the first mask 31 were superimposed, but the metal film 23 is provided at openings formed by the frame members 34, pattern portions 33, and first arms 32.

When forming the metal film, use is made of sputtering or vapor deposition. Due to this, metal film 23 having a predetermined thickness can be provided on the anti-reflection film 22 of the transparent member 20.

(Second Transparent Member Wafer Metal Film-Forming Step)

The second transparent member wafer metal film-forming step is a step, after the first transparent member wafer metal film-forming step, of superimposing the mask which was not used in the first transparent member wafer metal film-forming step on the one transparent member wafer 20W and forming a metal film 23 between the pattern portions and the frame members. Note that, an explanation will be given by defining the mask which was not used in the first transparent member wafer metal film-forming step as the second mask 41 (see FIG. 14).

Figure 15:
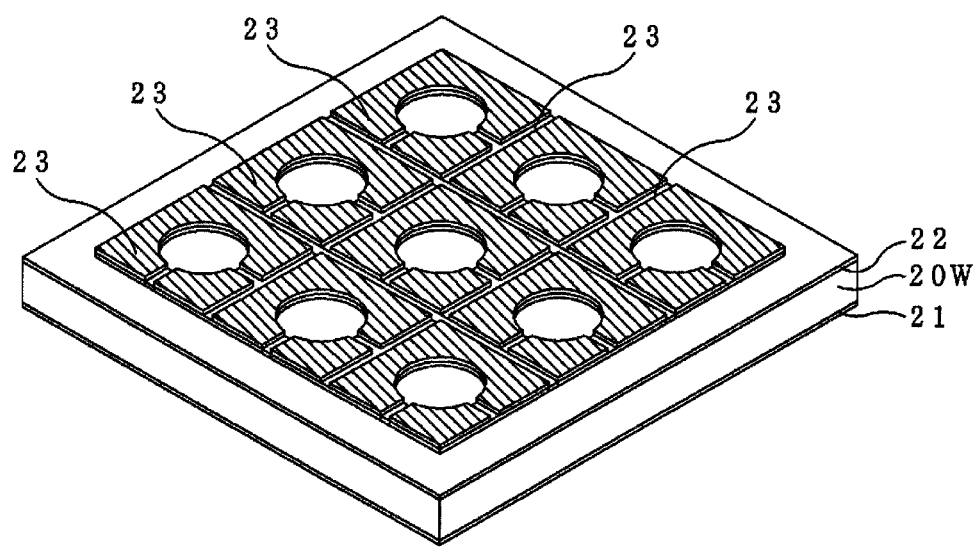
FIG. 15 is a perspective view which shows an example of provision of a metal film on the one transparent member wafer by using the second mask.

By this second transparent member wafer metal film-forming step, the state where the metal film 23 is further provided on the metal film 23 which was provided in the first transparent member wafer metal film-forming step is exhibited. At this time, as shown in FIG. 15, the transparent member wafer 20W becomes a state where the metal film 23 is not provided at the portions at which the second arms 42 and pattern portions 43 of the second mask 41 were superimposed, but the metal film 23 is provided in openings formed by the frame members 44, pattern portions 43, and second arms 42. Further, the first arms 32 and the second arms 42 differ in the directions in which they extend from the centers of the frame members 34 and 44. Therefore, in the second transparent member wafer metal film-forming step, the portions at which the second arms 42 are superimposed are prevented from being superimposed over the portions at which the first arms 32 were superimposed in the first transparent member wafer metal film-forming step. That is, the portions at which the first arms 32 were superimposed in the first transparent member wafer metal film-forming step becomes the state where the metal film 23 is provided by the second transparent member wafer metal film-forming step.

When providing the metal film 23, use is made of sputtering or vapor deposition. Due to this, metal film 23 having a predetermined thickness can be provided on the anti-reflection film 22 of the transparent member 20.

(Third Transparent Member Wafer Metal Film-Forming Step)

The third transparent member wafer metal film-forming step is a step of superimposing the second mask 41 on the other transparent member wafer and forming the metal film 23 between the pattern portions 43 and the frame members 44. Note that, in the present embodiment, the case of using the second mask 41 will be explained (not shown).

By this third transparent member wafer metal film-forming step, the state where the metal film 23 is provided on the anti-reflection film 22 is exhibited. At this time, the transparent member 20 becomes a state where the metal film 23 is not provided at the portions at which the second arms 42 and pattern portions 43 of the second mask 41 were superimposed, but the metal film 23 is provided in openings formed by the frame members 44, pattern portions 43, and second arms 42. At this time, desirably, as the mask to be superimposed on the transparent member wafer, use is made of a mask which is different from the mask used in the first transparent member wafer metal film-forming step.

When providing the metal film 23, use is made of sputtering or vapor deposition. Due to this, metal film 23 having a predetermined thickness can be provided on the anti-reflection film 22 of the transparent member 20.

Note that, in this third transparent member wafer metal film-forming step, the sequence of superimposing the mask on the transparent member wafer is the same as that for the mask which is used in the second transparent member wafer metal film-forming step, therefore the patterns of this mask are reflected at the metal film which is provided on the transparent member wafer.

(Fourth Transparent Member Wafer Metal Film-Forming Step)

The fourth transparent member wafer metal film-forming step is a step of, after the third transparent member wafer metal film-forming step, superimposing the mask which was not used in the third transparent member wafer metal film-forming step on the other transparent member wafer 20W and forming the metal film 23 between the pattern portions and the frame members. Note that, an explanation will be given by defining the mask which was not used in the third transparent member wafer metal film-forming step as the first mask 31 (not shown).

Figure 16:
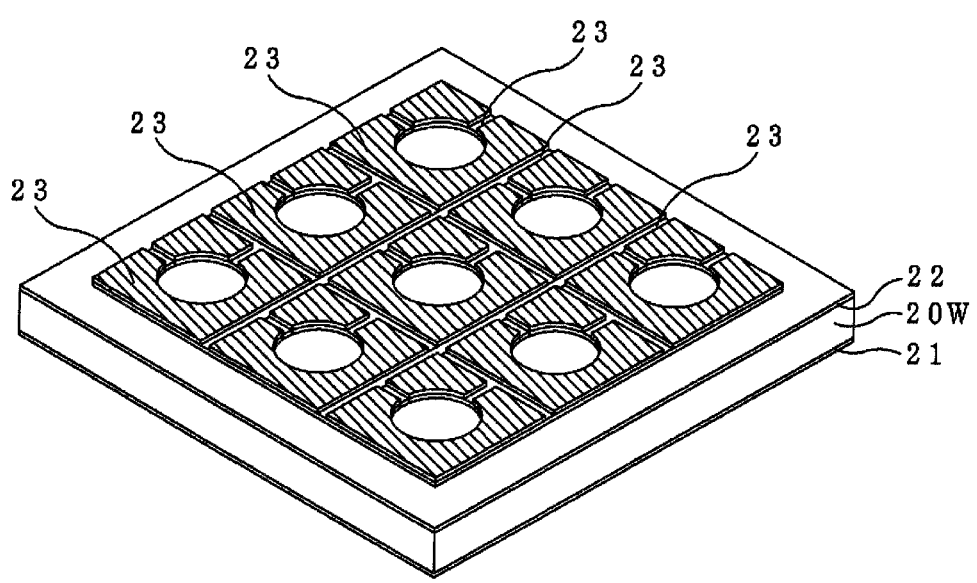
FIG. 16 is a perspective view which shows an example of provision of a metal film on another transparent member wafer by using a first mask, then provision by using the second mask.

By this fourth transparent member wafer metal film-forming step, the state where the metal film 23 is further provided on the metal film 23 provided in the third transparent member wafer metal film-forming step is exhibited. At this time, as shown in FIG. 16, the transparent member wafer 20W becomes a state where the metal film 23 is not superimposed at the portions at which the first arms 32 and pattern portions 33 of the first mask 31 were superimposed, but the metal film 23 is provided at the openings formed by the frame members 34, pattern portions 33, and first arms 32. That is, the portions at which the second arms 42 were superimposed in the third transparent member wafer metal film-forming step becomes the state where the metal film 23 is provided by the fourth transparent member wafer metal film-forming step.

When providing the metal film, use is made of sputtering or vapor deposition. Due to this, metal film 23 having a predetermined thickness can be provided on the anti-reflection film 22 of the transparent member 20.

Further, the first arms 32 and the second arms 42 differ in the directions in which they extend from the centers of the frame members 34 and 44. Therefore, the portions at which the second arms 42 were superimposed in the third transparent member wafer metal film-forming step are prevented from being superimposed over the portion at the first arms 32 were superposed in the fourth transparent member wafer metal film-forming step.

(Bonding Step)

Figure 17A:
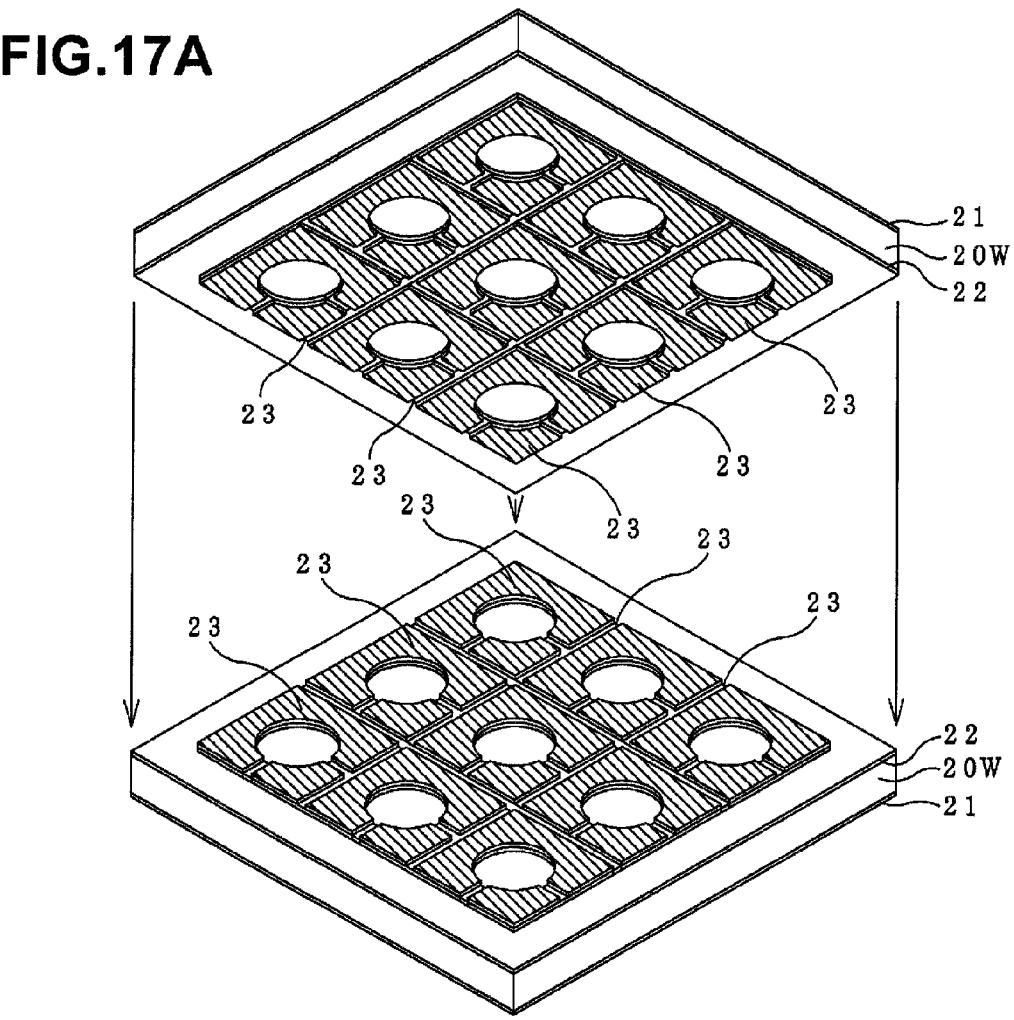
Figure 17B:
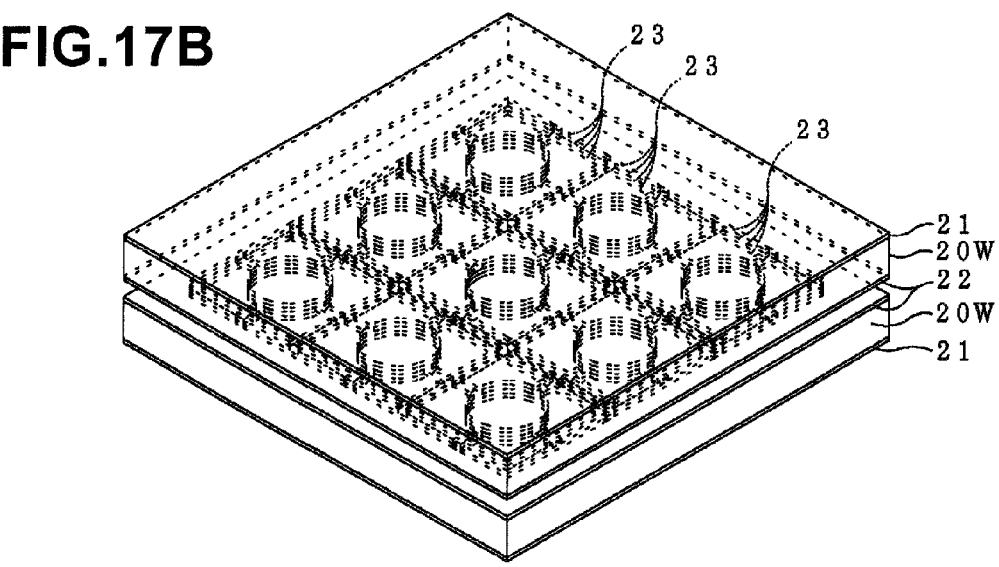
FIG. 17B is a perspective view which shows an example of a state where the one transparent member wafer and the other transparent member wafer are bonded.

The bonding step, as shown in FIGS. 17A and 17B, is the step of superimposing one transparent member wafer 20W and the other transparent member wafer 20W and bonding them at a predetermined temperature and under a predetermined pressure.

In this bonding step, the metal film 23 provided on one transparent member wafer 20W and the metal film 23 provided on the other transparent member wafer 20W are superimposed, and are bonded at the predetermined temperature and under the predetermined pressure. Note that, for bonding, for example, use can be made of atomic diffusion bonding.

Due to this, one transparent member wafer 20W and the other transparent member wafer 20W are bonded, therefore bonded transparent member wafers 20W including a plurality of optical devices can be formed.

(Dicing Step)

The dicing step is a step of dicing the bonded two transparent member wafers 20W to form individual optical devices.

In this dicing step, individual optical devices can be obtained by cutting at parts where the frame members of the first mask 31 and second mask 41 are superposed and where metal film 23 is not provided.

Since the method for producing the optical device was configured in this way, the first mask and the second mask differ in patterns, and the marks which are formed by the arms of the first mask and second mask are not superimposed on each other, so staining can be reduced. Further, the metal films are formed on the surfaces of the transparent members which face the portions which become marks which are formed by the arms of the first mask and the second mask, therefore it is possible to make the peeling harder.

Fourth Embodiment

An optical device 14 which produced by the method for producing an optical device according to a fourth embodiment of the present invention differs from the third embodiment in the point that marks which are formed by first arms of a first mask and the marks which are formed by second arms of a second mask are different.

(Optical Device)

Figure 18A:
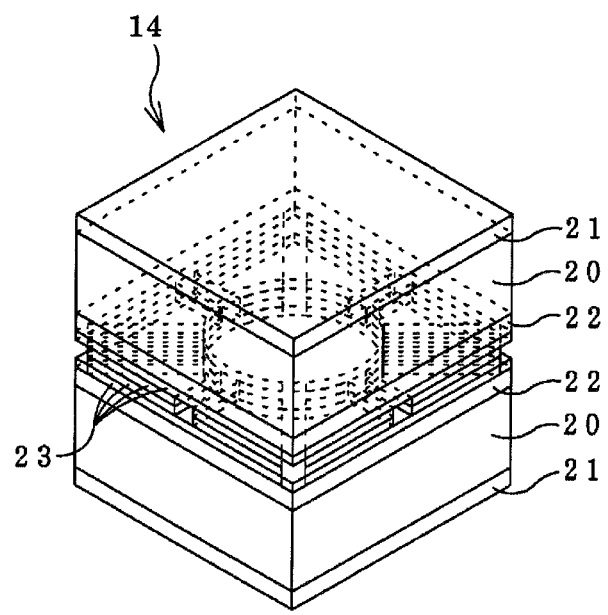
Figure 18B:
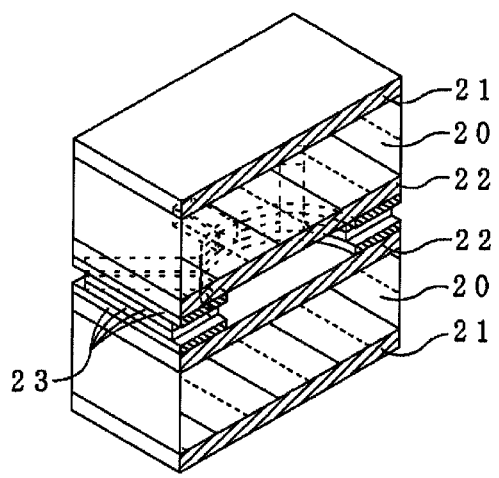
FIG. 18B is a cross-sectional view of FIG. 18A.

As shown in FIGS. 18A and 18B, the optical device 14 produced by the method for producing an optical device according to the fourth embodiment of the present invention is for example configured by bonding two transparent members 20 and 20.

In each transparent member 20, a reflection film 21 is provided on one major surface, and an anti-reflection film 22 is provided on the other major surface.

On the anti-reflection film 22 of this transparent member 20, a metal film 23 is provided except the central part of the major surface, and eight straight lines radially extending outward from this central part are formed.

The method for producing such an optical device according to the fourth embodiment of the present invention will be explained.

The method for producing the optical device according to the fourth embodiment of the present invention, as shown in FIGS. 8A and 8B, FIG. 9, and FIG. 19 to FIGS. 23A and 23B, is comprised of a first transparent member wafer metal film-forming step, a second transparent member wafer metal film-forming step, a third transparent member wafer metal film-forming step, a fourth transparent member wafer metal film-forming step, a bonding step, and a dicing step.

First, two masks having different patterns are prepared.

Figure 19:
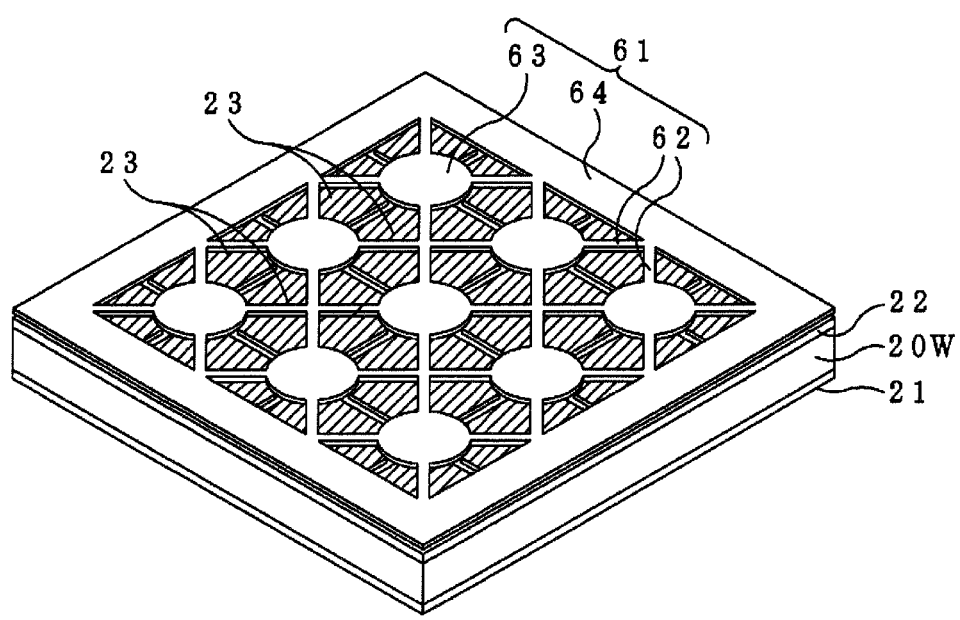
FIG. 19 is a perspective view which shows a state where a second mask is superimposed on one transparent member wafer.
Figure 20:
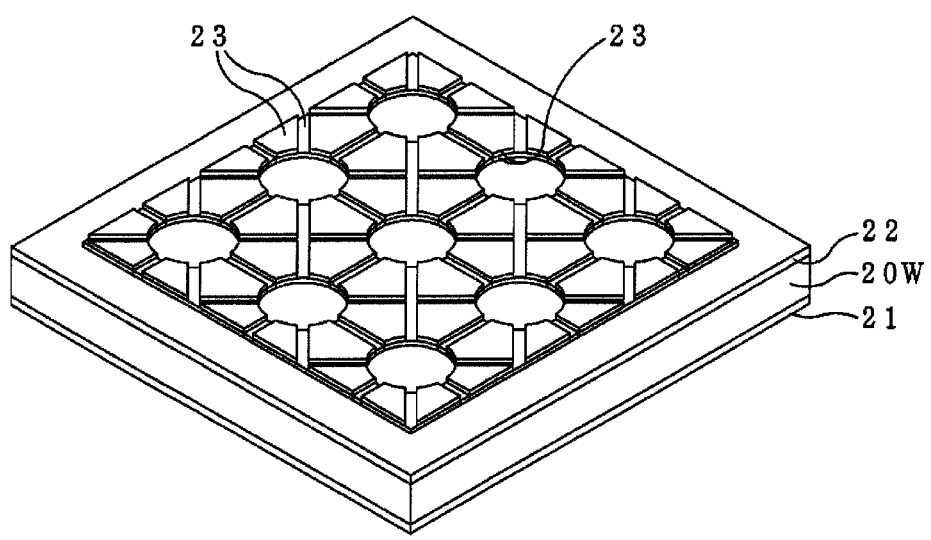
FIG. 20 is a perspective view which shows an example of provision of a metal film on the one transparent member wafer by using the second mask.
Figure 21:
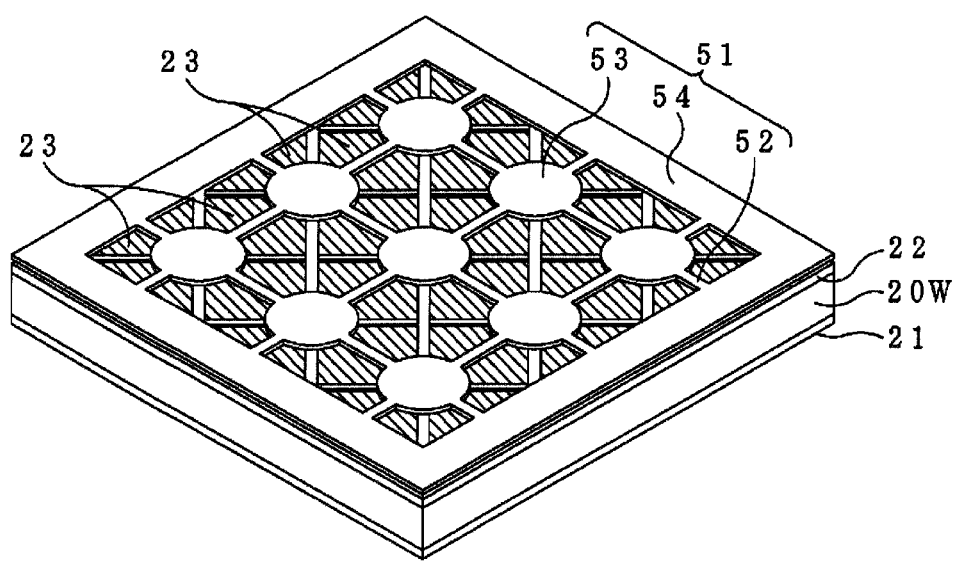
FIG. 21 is a perspective view which shows a state where a metal film is provided on the other transparent member wafer by using the second mask, then a first mask is superimposed.

As shown in FIG. 8A, it is deemed that the first mask 51 is the first mask 51 which was explained in the second embodiment. As shown in FIG. 19, it is deemed that the second mask 61 is made the second mask 61 which was explained in the second embodiment.

Next, transparent member wafers which become the transparent members 20 are prepared. In each of the transparent member wafers, an anti-reflection film is provided on one major surface, and a reflection film is provided on the other major surface.

(First Transparent Member Wafer Metal Film-Forming Step)

The first transparent member wafer metal film-forming step is a step of superimposing the first mask 51 or the second mask 61 on one transparent member wafer 20W between two transparent member wafers 20W each having the anti-reflection film 22 provided on one major surface and having the reflection film 21 provided on the other major surface and forming a metal film 23 between the pattern portions and the frame members. Note that, in the present embodiment, the case of using the first mask 51 will be explained (for example, see FIGS. 8A and 8B).

As shown in FIG. 9, by this first transparent member wafer metal film-forming step, the state where the metal film 23 is provided on the anti-reflection film 22 is exhibited. At this time, the transparent member wafer 20W becomes a state where the metal film 23 is not provided at the portions on which the first arms 51 and pattern portions 53 of the first mask 51 were superimposed, but the metal film 23 is provided at the openings formed by the frame members 54, pattern portions 53, and first arms 52. That is, the metal film 23 is formed while leaving patterns of four straight lines radially extending so as to connect the centers of the parallel sides of the transparent member 20 and leaving circle shapes.

When providing the metal film, use is made of sputtering or vapor deposition. Due to this, metal film 23 having a predetermined thickness can be provided on the anti-reflection film 22 of the transparent member 20.

(Second Transparent Member Wafer Metal Film-Forming Step)

The second transparent member wafer metal film-forming step is a step of, after the first transparent member wafer metal film-forming step, superimposing the mask which was not used in the first transparent member wafer metal film-forming step on one transparent member wafer and forming a metal film 23 between the pattern portions and the frame members. Note that, an explanation will be given while defining the mask which was not used in the first transparent member wafer metal film-forming step as the second mask 61 (see FIG. 19).

By this second transparent member wafer metal film-forming step, the state where the metal film 23 is further provided on the metal film 23 which was provided in the first transparent member wafer metal film-forming step is exhibited. At this time, the transparent member wafer 20W becomes a state where the metal film 23 is not provided at the portions at which the second arms 62 and pattern portions 63 of the second mask 61 were superimposed, but the metal film 23 is provided at openings formed by the frame members 64, pattern portions 63, and second arms 62. Further, the first arms 52 and the second arms 62 differ in the directions in which they extend from the centers of their frame members 54 and 64. Therefore, the portions at which the second arms 62 are superposed in the second transparent member wafer metal film-forming step are prevented from being superimposed over the portions at which the first arms 52 were superposed in the first transparent member wafer metal film-forming step. That is, the portions at which the first arms 52 were superimposed in the first transparent member wafer metal film-forming step become the state where the metal film 23 is provide by the second transparent member wafer metal film-forming step. Further, the metal film 23 is formed while leaving patterns of four straight lines radially extending so as to connect the circles and the corners of the transparent member wafer 20 (see FIG. 20).

When providing the metal film 23, use is made of sputtering or vapor deposition. Due to this, metal film 23 having a predetermined thickness can be provided on the anti-reflection film 22 of the transparent member 20.

(Third Transparent Member Wafer Metal Film-Forming Step)

The third transparent member wafer metal film-forming step is a step of superimposing the first mask or second mask on the other transparent member wafer and forming the metal film between the pattern portions and the frame members. Note that, in the present embodiment, the case of using the second mask 61 will be explained (not shown).

By this third transparent member wafer metal film-forming step, the state where the metal film 23 is provided on the anti-reflection film 22 is exhibited. At this time, the transparent member 20 becomes a state where the metal film 23 is not provided at the portions at which the second arms 62 and pattern portions 63 of the second mask 61 were superimposed, but the metal film 23 is provided in openings formed by the frame members 64, pattern portions 63, and second arms 62. At this time, desirably, as the mask to be superimposed on the transparent member wafer 20W, use is made of a mask which is different from the mask used in the first transparent member wafer metal film-forming step.

When providing the metal film 23, use is made of sputtering or vapor deposition. Due to this, metal film 23 having a predetermined thickness can be provided on the anti-reflection film 22 of the transparent member 20.

Note that, in this third transparent member wafer metal film-forming step, the sequence of superimposing the mask on the transparent member wafer is the same as that for the mask which is used in the second transparent member wafer metal film-forming step, therefore the patterns of this mask are reflected at the metal film which is provided on the transparent member wafer.

(Fourth Transparent Member Wafer Metal Film-Forming Step)

The fourth transparent member wafer metal film-forming step is a step of, after the third transparent member wafer metal film-forming step, superimposing the mask which was not used in the third transparent member wafer metal film-forming step on the other transparent member wafer 20W and forming the metal film 23 between the pattern portions and the frame members. Note that, an explanation will be given by defining the mask which was not used in the third transparent member wafer metal film-forming step as the first mask 51 (see FIG. 21).

Figure 22:
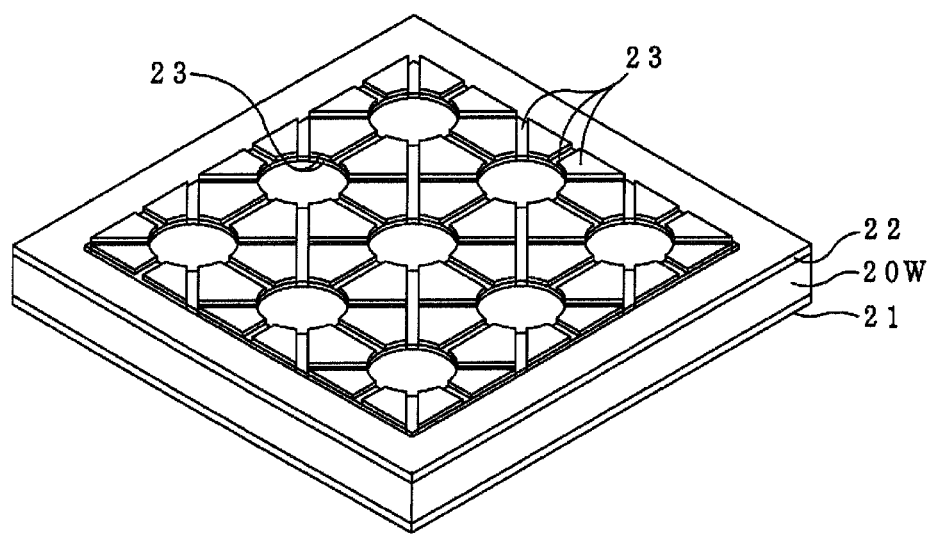
FIG. 22 is a perspective view which shows an example of provision of a metal film on the another transparent member wafer by using the second mask, then provision by using a first mask.

By this fourth transparent member wafer metal film-forming step, the state where the metal film 23 is further provided on the metal film 23 which was provided in the third transparent member wafer metal film-forming step is exhibited (see FIG. 22). At this time, the transparent member wafer 20W becomes a state where the metal film 23 is not superimposed at the portions at which the first arms 52 and pattern portions 53 of the first mask 51 were superimposed, but the metal film 23 is provided at the openings formed by the frame members 54, pattern portions 53, and first arms 52. That is, the portions at which the second arms 62 were superimposed in the third transparent member wafer metal film-forming step become the state where the metal film 23 is provided by the fourth transparent member wafer metal film-forming step.

When providing the metal film, use is made of sputtering or vapor deposition. Due to this, metal film 23 having a predetermined thickness can be provided on the anti-reflection film 22 of the transparent member 20.

Further, the first arms 52 and the second arms 62 differ in the directions in which they extend from the centers of the frame members 54 and 64. Therefore, the portions at which the second arms 62 were superimposed in the third transparent member wafer metal film-forming step are prevented from being superimposed over the portion at the first arms 52 were superposed in the fourth transparent member wafer metal film-forming step.

(Bonding Step)

Figure 23A:
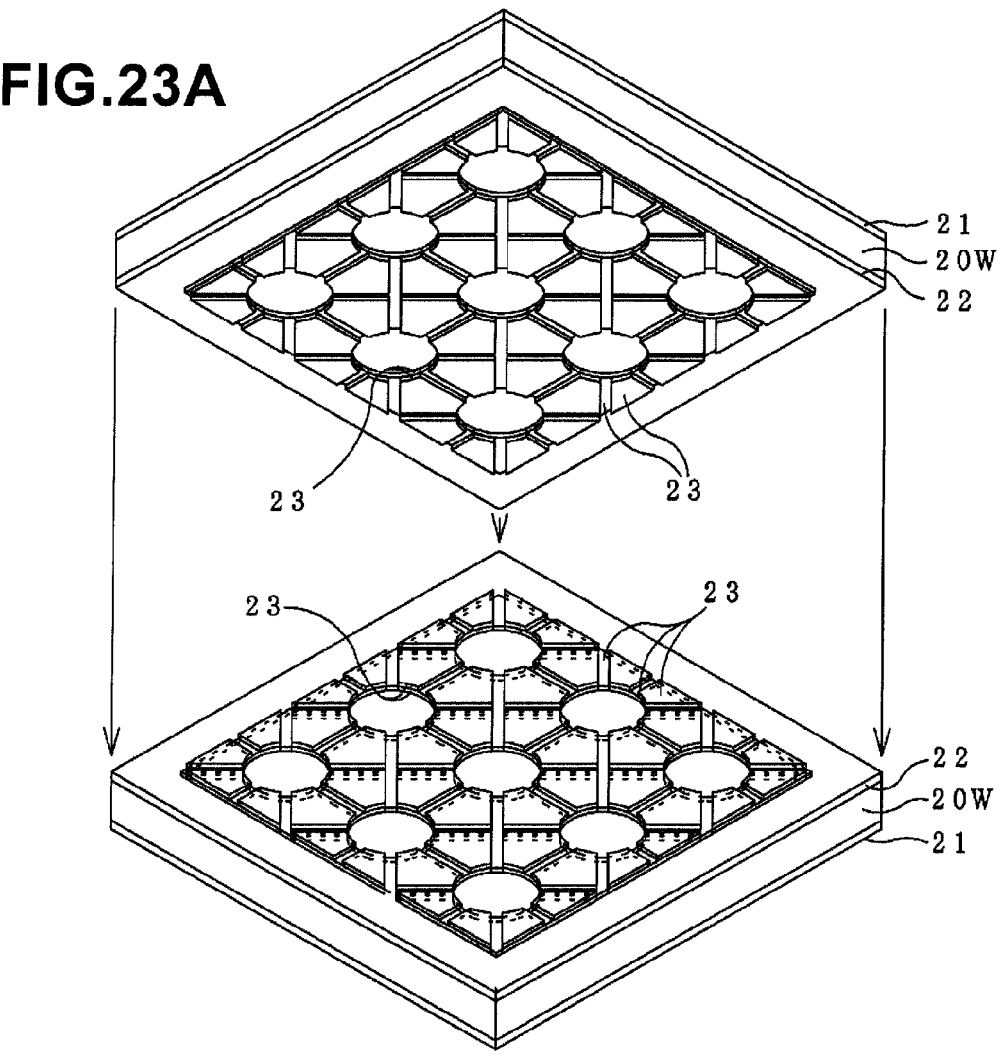
Figure 23B:
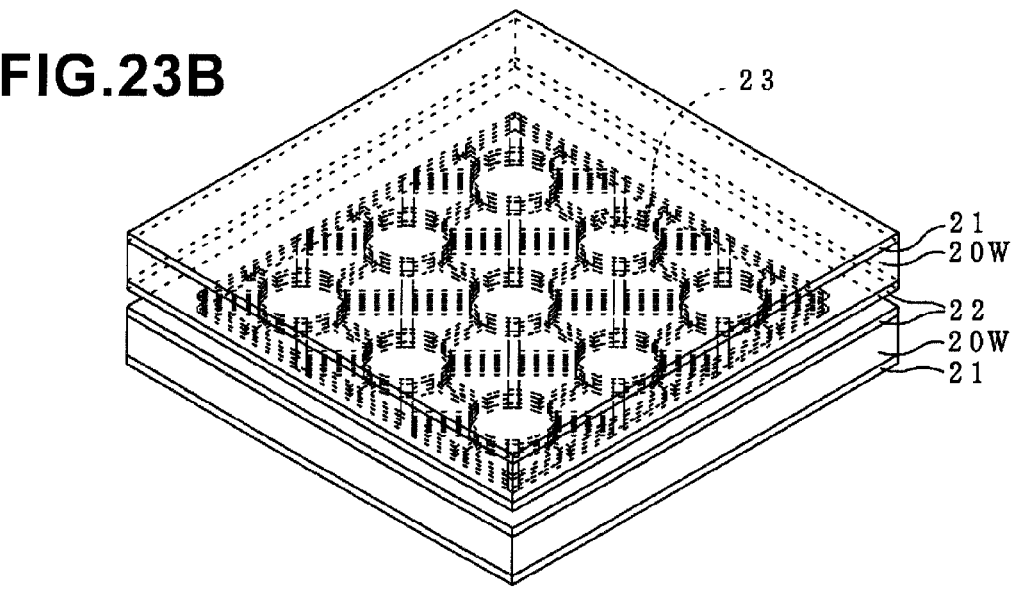
FIG. 23B is a perspective view which shows an example of the state where the one transparent member wafer and the other transparent member wafer are bonded.

The bonding step, as shown in FIGS. 23A and 23B, is the step of superimposing one transparent member wafer 20W and the other transparent member wafer 20W and bonding them at a predetermined temperature and under a predetermined pressure.

In this bonding step, the metal film 23 provided on one transparent member wafer 20W and the metal film 23 provided on the other transparent member wafer 20W are superimposed, and are bonded at the predetermined temperature and under the predetermined pressure. Note that, for bonding, for example, use can be made of atomic diffusion bonding.

Due to this, one transparent member wafer 20W and the other transparent member wafer 20W are bonded, therefore bonded transparent member wafers 20W including a plurality of optical devices can be formed.

(Dicing Step)

The dicing step is a step of dicing the bonded two transparent member wafers 20W to form individual optical devices.

In this dicing step, individual optical devices can be obtained by cutting at parts where the frame members of the first mask 51 and second mask 61 are superposed and where metal film 23 is not provided. For dicing, use can be made of a rotating blade or the like.

Since the method for producing the optical device was configured in this way, the first mask and the second mask differ in patterns, and the marks which are formed by the arms of the first mask and second mask are not superimposed on each other, so staining can be reduced. Foreign substances can be made harder to penetrate. Further, the metal films are formed on the surfaces of the transparent members which face the portions at which become marks which are formed by the arms of the first mask and the second mask, therefore it is possible to make the peeling harder.

Note that, the present invention is not limited to these embodiments, but can be suitably changed for use.

For example, in the third and fourth embodiments, as the mask to be superimposed on the transparent member wafer, the first mask may be used in the first transparent member wafer metal film-forming step, the second mask may be used in the second transparent member wafer metal film-forming step, the first mask may be used in the third transparent member wafer metal film-forming step, and the second mask may be used in the fourth transparent member wafer metal film-forming step.

Further, for example, in the third and fourth embodiments, as the mask to be superimposed on the transparent member wafer, the second mask may be used in the first transparent member wafer metal film-forming step, the first mask may be used in the second transparent member wafer metal film-forming step, the second mask may be used in the third transparent member wafer metal film-forming step, and the first mask may be used in the fourth transparent member wafer metal film-forming step.

Further, for example, the metal films are not limited to two-layers or four-layers and may be three-layers or five- or more layers as well.

Further, such a method for producing an optical device according to the present invention can be applied to an optical device configured by bonding transparent members with each other, for example, an etalons, a halfwave plates, a quarterwave plates or the like.

For example, an etalon as an optical device is comprised by, in two transparent members each having a reflection film provided on one major surface and having an anti-reflection film provided on the other major surface, providing a metal film on the anti-reflection films, and bonding the metal films to each other.

Further, for example, by providing metal films on two transparent members without providing a reflection film and bonding the metal films to each other, a halfwave plate or a quarterwave plate as an optical device is configured.

REFERENCE SIGNS LIST 11, 12, 13, 14 optical devices
20 transparent member
23 metal film
31, 51 first masks
32, 52 first arms
33, 53 pattern portions
34, 54 frame members
41, 61 second masks
42, 62 second arms
43, 63 pattern portions
44, 64 frame members

The invention claimed is:

1. A method for producing optical devices each configured by bonding a first transparent member and a second transparent member, using:
 a first mask which is comprised of first arms, pattern portions each connected with one of the first arms and formed in a polygon shape or circle shape, and a frame member which is connected to the pattern portions, and
 a second mask which is comprised of second arms provided in a direction different from that of the first arms of the first mask, pattern portions each connected with one of the second arms and formed in a polygon shape or circle shape, and a frame member which is connected to the pattern portions; and comprising:
 a first transparent member wafer metal film-forming step of superimposing the first mask on a first transparent member wafer having portions which become pluralities of the first transparent members and forming a first metal film between the pattern portions and the frame member,
 a second transparent member wafer metal film-forming step of superimposing the second mask on a second transparent member wafer having portions which become pluralities of the second transparent members and forming a second metal film between the pattern portions and the frame member,
 a bonding step of making the first metal film side of the first transparent member wafer and the second metal film side of the second transparent member wafer face each other and bonding these wafers at a predetermined temperature and under a predetermined pressure, and
 a dicing step of dicing the bonded first and second transparent member wafers to form individual optical devices, wherein:
 each of the first arms forms an X-shape having one of the pattern portions as the crossed part, and
 each of the second arms forms a cross shape having one of the pattern portions as the crossed part.

2. The method for producing optical devices according to claim 1, wherein a reflection film is provided on one major surface of each of the first and second transparent members, an anti-reflection film is provided on the other major surface of each of the first and second transparent members, and the first and second metal films are provided on the anti-reflection films.

3. The method for producing optical devices according to claim 1, wherein at least one of the first and second metal films is provided by sputtering or vapor deposition.

4. A method for producing optical devices each configured by bonding a first transparent member and a second transparent member, using:
 a first mask which is comprised of first arms, first pattern portions each connected with one of the first arms and formed in a polygon shape or circle shape, and a frame member which is connected to the pattern portions, and
 a second mask which is comprised of second arms provided in a direction different from that of the first arms of the first mask, pattern portions each connected with one of the second arms and formed in a polygon shape or circle shape, and a frame member which is connected to the pattern portions; and comprising:
 a first transparent member wafer metal film-forming step of superimposing the first mask or second mask on a first transparent member wafer having portions which become pluralities of the first transparent members and forming a first metal film between the pattern portions and the frame member,
 a second transparent member wafer metal film-forming step, after the first transparent member wafer metal film-forming step, of superimposing one of the first and second masks which is not used in the first transparent member wafer metal film-forming step on the first metal film side of the first transparent member wafer and forming a second metal film between the pattern portions and the frame member,
 a third transparent member wafer metal film-forming step of superimposing the first mask or second mask on the second transparent member wafer having portions which become pluralities of the second transparent members and forming a third metal film between the pattern portions and the frame member,
 a fourth transparent member wafer metal film-forming step, after the third transparent member wafer metal film-forming step, of superimposing one of the first and second masks which is not used in the third transparent member wafer metal film-forming step on the third metal film side of the second transparent member wafer and forming a fourth metal film between the pattern portions and the frame member,
 a bonding step of making the first and second metal film sides of the first transparent member wafer and the third and fourth metal film sides of the second transparent member wafer face each other and bonding these wafers at a predetermined temperature and under a predetermined pressure, and
 a dicing step of dicing the bonded first and second transparent member wafers to form individual optical devices.

5. The method for producing optical devices according to claim 4, wherein:

each of the first arms is configured by one arm part, and each of the second arms is configured by one arm part.

6. The method for producing optical devices according to claim 4, wherein:
each of the first arms forms an X-shape having the pattern portion as the crossed part, and
each of the second arms forms a cross shape having the pattern portion as the crossed part.

7. The method for producing optical devices according to claim 4, wherein a reflection film is provided on one major surface of each of the first and second transparent members, an anti-reflection film is provided on the other major surface of each of the first and second transparent members, and the first and third metal films are provided on the anti-reflection films.

8. The method for producing optical devices according to claim 4, wherein at least one of the first to fourth metal films is provided by sputtering or vapor deposition.

* * * * *